United States Patent
Lysenko et al.

(10) Patent No.: US 9,562,823 B2
(45) Date of Patent: *Feb. 7, 2017

(54) DETERMINING CYLINDER HEALTH IN A RECIPROCATING PISTON ENGINE

(71) Applicant: Deere & Company, Moline, IL (US)

(72) Inventors: George P. Lysenko, Elk Run Heights, IA (US); Kevin A. Price, Cedar Falls, IA (US); Kyle M. Krisher, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,110

(22) Filed: Dec. 15, 2015

(65) Prior Publication Data

US 2016/0097694 A1    Apr. 7, 2016

Related U.S. Application Data

(63) Continuation-in-part of application No. 14/161,446, filed on Jan. 22, 2014, now Pat. No. 9,243,571.

(51) Int. Cl.
*B60T 7/12* (2006.01)
*G01M 3/02* (2006.01)
(Continued)

(52) U.S. Cl.
CPC ............ *G01M 3/025* (2013.01); *F02D 35/023* (2013.01); *G01M 15/06* (2013.01); *G01M 15/08* (2013.01); *F02D 41/009* (2013.01); *F02D 41/22* (2013.01)

(58) Field of Classification Search
CPC ..... F02D 41/222; F02D 41/009; G01M 15/06; G01M 15/08
(Continued)

(56) References Cited

U.S. PATENT DOCUMENTS

| 4,197,767 A | 4/1980 | Leung |
| 4,348,893 A | 9/1982 | Hendrix et al. |

(Continued)

FOREIGN PATENT DOCUMENTS

| DE | 3721162 | 1/1988 |
| DE | 102007059589 | 6/2009 |
| GB | 2192028 | 12/1987 |

OTHER PUBLICATIONS

Wiki,How to Find Your Engine's Top Dead Center (TDC), http://www.wikihow.com/Find-Your-Engine%27s-Top-Dead-Center-%28TDC%29, Admitted Prior Art.

(Continued)

*Primary Examiner* — John Kwon
(74) *Attorney, Agent, or Firm* — Lorenz & Kopf, LLP

(57) ABSTRACT

Computer-implemented methods, computer program products, and computer systems are described for determining cylinder health characteristic in a reciprocating piston engine of the type including a piston-cylinder assembly and a crankshaft. The piston-cylinder assembly includes a cylinder and a piston configured to translate within the cylinder as the crankshaft rotates. In one embodiment, the computer-implemented method includes rotating the crankshaft in a first direction, while generating a first data set comprising a first plurality of piston position measurements and corresponding pressure indicator measurements. The crankshaft is further rotated in a second opposing direction, while a second data set is generated comprising a second plurality of piston position measurements and corresponding pressure indicator measurements. A symmetric aspect between the first and second data sets is then identified and utilized to determining a cylinder health characteristic for the piston-cylinder assembly.

20 Claims, 10 Drawing Sheets

(51) Int. Cl.
*G01M 15/08* (2006.01)
*G01M 15/06* (2006.01)
*F02D 35/02* (2006.01)
*F02D 41/22* (2006.01)
*F02D 41/00* (2006.01)

(58) Field of Classification Search
USPC ......... 701/101, 114, 115; 73/114.16–114.18, 73/114.22, 114.26–114.28
See application file for complete search history.

(56) References Cited

U.S. PATENT DOCUMENTS

| | | | |
|---|---|---|---|
| 4,453,402 A | 6/1984 | Grant | |
| 4,520,658 A | 6/1985 | Ryan et al. | |
| 4,653,315 A | 3/1987 | Ament et al. | |
| 4,821,194 A * | 4/1989 | Kawamura | F02P 11/06 123/406.16 |
| 5,359,883 A | 11/1994 | Baldwin et al. | |
| 5,459,940 A | 10/1995 | McKenzie | |
| 6,367,317 B1 | 4/2002 | Jaye | |
| 6,564,623 B2 | 5/2003 | Zanetti | |
| 6,910,369 B2 | 6/2005 | Okuda et al. | |
| 7,117,080 B2 | 10/2006 | Sobel | |
| 7,360,511 B2 | 4/2008 | Lemke | |
| 7,469,576 B2 | 12/2008 | Kruger | |
| 7,974,762 B2 * | 7/2011 | Tunestal | G01M 15/09 123/435 |
| 8,245,567 B2 | 8/2012 | Wang et al. | |
| 9,243,571 B2 * | 1/2016 | Lysenko | F02D 28/00 |
| 2001/0006004 A1 | 7/2001 | Zanetti | |
| 2007/0245892 A1 | 10/2007 | Lemke et al. | |
| 2008/0221774 A1 | 9/2008 | Dagci | |
| 2008/0249677 A1 | 10/2008 | Kruger | |

OTHER PUBLICATIONS

German Search Report for related application DE 10 2014 225 751.4, dated Dec. 12, 2014.

* cited by examiner

DETERMINING CYLINDER HEALTH IN A RECIPROCATING PISTON ENGINE

CROSS-REFERENCE TO RELATED APPLICATION(S)

This application is a continuation-in-part of U.S. patent application Ser. No. 14/161,446, filed on Jan. 22, 2014.

STATEMENT OF FEDERALLY SPONSORED RESEARCH OR DEVELOPMENT

Not applicable.

FIELD OF THE DISCLOSURE

This disclosure relates to reciprocating piston engines and similar devices. In particular, this disclosure relates to piston operation, and in particular to accurately determining the location of top dead center of various pistons of such engines (or devices), as well as to determining cylinder leakage characteristics and other parameters related to cylinder health in reciprocating piston engines.

BACKGROUND OF THE DISCLOSURE

In reciprocating engines and other devices, a piston may reciprocate within a cylinder to produce useful power. In a typical internal combustion engine, for example, one or more pistons may be housed within one or more corresponding cylinders, with each piston connected to a crankshaft by a connecting rod. At the end opposite the crankshaft, each cylinder may be closed (e.g., by the engine cylinder head), with the piston thereby defining (along with the cylinder) a combustion chamber. Various valves and other mechanisms may then control the in- and out-flow of air and fuel. When a piston is fully displaced into the cylinder (and away from the crankshaft) the piston may be considered to have reached top dead center ("TDC"). As such, TDC may generally be viewed as the point within a piston's cyclical motion at which the nominal maximum compression of gas within the cylinder (and the minimum combustion-chamber volume) has been obtained. Likewise, when a piston is fully retracted away from TDC (and toward the crankshaft) the piston may be considered to have reached bottom dead center ("BDC"). As such, BDC may generally be viewed as the point within a piston's cyclical motion at which the nominal minimum compression of gas within the cylinder (and the maximum combustion-chamber volume) has been obtained. It will be understood, however, that other configurations may be possible. Therefore, it may also be useful to consider TDC and BDC as opposite orientations for a piston at which, for both TDC and BDC, a normal force applied to the piston face is directed, via the associated connecting rod, straight along the main axis of the relevant cylinder or straight into an associated crankshaft.

During engine operation (or as the engine is otherwise motored), the pistons may travel along the path of various piston strokes, each of which may be considered as including the path of travel of a piston between TDC and BDC (or vice versa). In this light, it may be useful to consider a reciprocating piston as having two main categories of strokes—an "up-stroke," during which the piston is progressed in a direction from BDC toward TDC; and a "down-stroke," during which the piston is progressed in a direction from TDC toward BDC. In certain engines, further distinction may be made, with respect to powered and other strokes. For example, in a four-stroke engine, a first up-stroke may compress air within the combustion chamber, a first down-stroke may be driven by combustion of fuel within the cylinder (and the associated expansion of the contained air and combustion products), a second up-stroke may force air and combustion products out of an exhaust valve, and a second down-stroke may draw new air into the cylinder through an intake valve, in order to re-set the engine for the next cycle.

For various reasons, it may be highly useful to determine the exact (or near-exact) location of TDC for the various pistons of a reciprocating engine (or other cylinder-piston systems). For example, ignition timing for an internal combustion engine may often be specified with respect to TDC (e.g., so many degrees before or after TDC). Because precise ignition timing may play an important role in controlling engine dynamics and the corresponding composition of exhaust emissions, it may be useful to know the location of TDC with a high degree of precision. It may be difficult, however, to determine the location of TDC with high precision based upon manufacturing specifications alone. For example, even with highly precise manufacturing, the permitted manufacturing tolerances of various parts may combine to introduce relatively large uncertainty with regard to the actual TDC position of any given piston. As such, although an expected TDC position may be identified (e.g., based on manufacturing specifications, visual inspection, and so on), this expected TDC position may sometimes vary from actual TDC by 1.5 degrees or more.

In current practice, linear displacement instruments are often utilized to measure TDC before the engine cylinder head is installed on the engine block. For example, an engine block may be securely mounted, and a linear displacement instrument (e.g., a linear encoder) may be securely fixed with respect to the engine block, with a probe extended into contact with the head of a piston that is not at TDC. The piston may then be advanced along its cyclical path (e.g., towards and then past the expected position of TDC), which will displace the probe accordingly. In such a set-up, the minimum extension of the probe during the progression of the piston may be viewed as corresponding to TDC. If the position of the piston is recorded (e.g., via a mechanical, magnetic, or other sensor associated with the crankshaft or a related gear) and correlated with the linear displacement measurements, the approximate position of TDC with respect to crankshaft rotation (or similar reference) may be then be recorded. This method may present various disadvantages, however, including somewhat limited accuracy, the need to securely fix the engine in place to execute the testing, and the general inability to conduct the testing with the cylinder head in place.

SUMMARY OF THE DISCLOSURE

A system and method are disclosed for identifying top dead center for one or more pistons configured to move in cyclical motion within one or more cylinders.

According to one aspect of the disclosure, a computer-implemented method includes progressing a piston in a first direction, along a first piston stroke included in the cyclical motion, toward an expected top dead center position of the piston. A plurality of first positions of the piston and corresponding first pressure indicators are determined as part of a first data set, by the one or more computing devices, as the piston is progressed in the first direction along the first piston stroke. The piston is also progressed in a second direction, along a second piston stroke included in the cyclical motion, toward the expected top dead center position of the piston. A plurality of second positions of the piston and corresponding second pressure indicators are determined as part of a second data set, by the one or more computing devices, as the piston is progressed in the second direction along the second piston stroke. One or more symmetric aspects of the first data set, with respect to the second data set, are determined by the one or more computing devices, and an updated top dead center position is determined, by the one or more computing devices, based upon the symmetric aspects. Additionally or alternatively, a leakage characteristic (or other cylinder health characteristic) associated with the one or more cylinders may be determined based, at least in part, upon the determined one or more first symmetric aspects.

One or more of the following features may be included. The plurality of first and second positions may be determined using a rotational encoder attached to a crankshaft associated with the piston. A cylinder containing the piston may be equalized to an ambient pressure after progressing the piston in the first direction and before progressing the piston in the second direction. Determining the symmetric aspect of the data may be based upon determining linear extensions of portions of the first and second data sets, or identifying numerical distances between data from the two data sets.

The method may also include progressing the piston again in the first direction along the first piston stroke, toward an expected top dead center position of the piston. A plurality of third positions of the piston and corresponding third pressure indicators may be determined as part of a third data set, as the piston is progressed again in the first direction along the first piston stroke. One or more symmetric aspects of the third data set, with respect to the second data set, may be determined, and with the updated top dead center position being determined also based upon these symmetric aspects. One or more average pressure indicators may be determined based upon the first and the third data sets, and determining symmetric aspects of the data sets may be based upon the average pressure indicators.

According to another aspect of the disclosure, a computer-implemented method includes progressing a piston in a first direction along a first piston stroke included in the cyclical motion. A plurality of first positions of the piston and corresponding first pressure indicators are determined as part of a first data set, by the one or more computing devices, as the piston is progressed in the first direction along the first piston stroke, wherein the first positions include positions to one side of an expected position of top dead center of the piston, with respect to one cycle of the piston during normal operation of the engine. The piston is also progressed in a second direction, along a second piston stroke included in the cyclical motion. A plurality of second positions of the piston and corresponding second pressure indicators are determined as part of a second data set, by the one or more computing devices, as the piston is progressed in the second direction along the second piston stroke, wherein the second positions include positions to another side of an expected position of top dead center of the piston, with respect to the one cycle of the piston during normal operation of the engine. One or more symmetric aspects of the first data set, with respect to the second data set, are determined by the one or more computing devices, and an updated top dead center position is determined, by the one or more computing devices, based upon the symmetric aspects.

One or more of the following features may be included. The first direction along the first piston stroke may be toward the expected position of top dead center and progressing the piston in the first direction along the first piston stroke may pressurize a cylinder containing the piston above an ambient pressure. The first direction along the first piston stroke may be away from the expected position of top dead center and progressing the piston in the first direction along the first piston stroke may reduce pressure within a cylinder containing the piston below an ambient pressure.

A cylinder containing the piston may be equalized to an ambient pressure after progressing the piston in the first direction and before progressing the piston in the second direction. Determining the symmetric aspect of the data may be based upon determining linear extensions of portions of the first and second data sets, or identifying numerical distances between data from the two data sets.

The method may also include progressing the piston again in the first direction along the first piston stroke. A plurality of third positions of the piston and corresponding third pressure indicators may be determined as part of a third data set, as the piston is progressed again in the first direction along the first piston stroke. One or more symmetric aspects of the third data set, with respect to the second data set, may be determined, and with the updated top dead center position being determined also based upon these symmetric aspects. One or more average pressure indicators may be determined based upon the first and the third data sets, and determining symmetric aspects of the data sets may be based upon the average pressure indicators.

According to another aspect of the disclosure, a computing system includes one or more processor devices and one or more memory architectures coupled with the one or more processor devices. The one or more processor devices are configured to determine a plurality of first positions and corresponding first pressures of a piston, as part of a first data set, as the piston is progressed in a first direction along a first piston stroke included in the cyclical motion, the first positions including, at least in part, positions to one side of an expected position of top dead center of the piston, with respect to one cycle of the piston during normal operation of the engine. The one or more processor devices are configured to determine a plurality of second positions of the piston and corresponding second pressures, as part of a second data set, as the piston is progressed in a second direction along a second piston stroke included in the cyclical motion, the second positions including, at least in part, positions to another side of an expected position of top dead center of the piston, with respect to the one cycle of the piston during normal operation of the engine. The one or more processor devices are configured to determine one or more symmetric aspects of the first data set, with respect to the second data set, and to determine an updated top dead center position based upon the symmetric aspects.

One or more of the following features may be included. The first direction along the first piston stroke may be toward the expected position of top dead center and progressing the piston in the first direction along the first piston stroke may pressurize a cylinder containing the piston above an ambient pressure. The first direction along the first piston stroke may be away from the expected position of top dead center and progressing the piston in the first direction along the first piston stroke may reduce pressure within a cylinder containing the piston below an ambient pressure. A cylinder containing the piston may be equalized to an ambient pressure after the piston is progressed in the first direction and before the piston is progressed in the second direction.

The one or more processor devices may be configured to determine, as part of a third data set, a plurality of third positions of the piston and corresponding third pressure indicators as the piston is progressed again in the first direction along the first piston stroke. The one or more processor devices may be further configured to determine one or more symmetric aspects of the third data set, with respect to the second data set, and to determine an updated top dead center position for the piston based upon these symmetric aspects.

According to yet another aspect of the disclosure, a computer-implemented method is provided for determining cylinder health in a reciprocating piston engine containing a piston-cylinder assembly and a crankshaft. The piston-cylinder assembly includes a cylinder and a piston configured to translate within the cylinder as the crankshaft rotates. In one embodiment, the computer-implemented method includes the steps or processes of: (i) rotating the crankshaft in a first direction, while generating a first data set comprising a first plurality of piston position measurements and corresponding pressure indicator measurements; (ii) rotating the crankshaft in a second opposing direction, while generating a second data set comprising a second plurality of piston position measurements and corresponding pressure indicator measurements; (iii) identifying a symmetric aspect between the first and second data sets; and (iv) determining a cylinder health characteristic for the piston-cylinder assembly based, at least in part, on the symmetric aspect.

Finally, according to still further aspect of the disclosure, there is provided a computer system for determining cylinder health in a reciprocating piston engine containing a piston-cylinder assembly and a crankshaft. The piston-cylinder assembly includes a cylinder and a piston configured to translate within the cylinder as the crankshaft rotates. In an embodiment, the computer system includes one or more processor devices, a first sensor coupled to the one or more processor devices and configured to record measurements indicative of piston position, and a second sensor coupled to the one or more processor devices and configured to record measurements indicative of a pressure within the cylinder. One or more memory architectures are coupled to the one or more processor devices and store instructions executable by the one or more processors to: (i) generate a first data set while the crankshaft is rotated in a first direction utilizing data received from the first and second sensors, the first data set comprising a first plurality of piston position measurements and corresponding pressure indicator measurements; (ii) generate a second data set while the crankshaft is rotated in a second opposing direction utilizing data received from the first and second sensors, the second data set comprising a second plurality of piston position measurements and corresponding pressure indicator measurements; (iii) identify a symmetric aspect between the first and second data sets; and (iv) determine a cylinder health characteristic for the piston-cylinder assembly based, at least in part, on the symmetric aspect.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
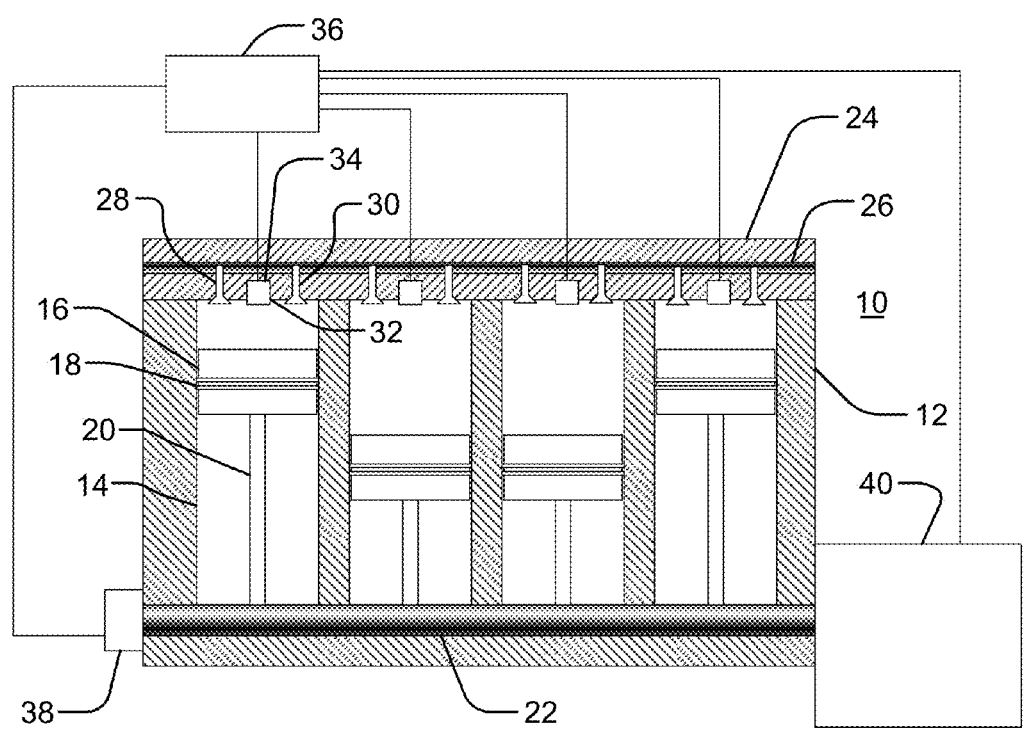
FIG. 1 is a side view of an example engine with respect to which the disclosed system and/or method may be implemented.

The following describes one or more example embodiments of the disclosed system and method, as shown in the accompanying figures of the drawings described briefly above.

As noted above, it may be useful to accurately determine TDC for a reciprocating piston. In various embodiments, the method (or computer system or computer program product) disclosed herein may enable a high level of accuracy for this determination. Further, in certain embodiments, the disclosed method may allow TDC to be determined with a cylinder head in place or without securely anchoring the tested engine, which may allow for various improvements in the efficiency of cold- (and other) testing of an engine.

A TDC measurement ("TDCM") method (or process, application, and so on) may be executed with respect to a variety of reciprocating engines (or other reciprocating machines), including the engines of various work vehicles such as tractors, motor graders, log skidders, and so on. In certain implementations, a TDCM process may be executed with respect to an engine during the manufacturing process, although a TDCM process is not necessarily limited to manufacturing applications. In certain implementations, a TDCM process may be executed with respect to an engine with a cylinder head and valves (but not, for example, the various valve rocker arms) already installed.

In one implementation, a TDCM process may utilize a rotational encoder (e.g., an optical encoder) attached to a crankshaft of an engine, and a pressure sensor inserted into a cylinder of an engine through a spark-plug, fuel-injector, or other port. Starting near BDC with the associated cylinder at ambient (or other known) pressure, a piston may be advanced along an up-stroke (i.e., advanced toward TDC) by a motor attached to the crankshaft (or other mechanism or motoring arrangement), and various position and (corresponding) pressure measurements may be taken by the pressure sensor and encoder. The piston may then be returned to a position near BDC, cylinder pressure may be re-equalized to the ambient (or other known) pressure, and the piston may be advanced along another up-stroke, but in a direction opposite the first up-stroke (i.e., so as to approach TDC from the other side, with respect to the piston's normal cyclical motion). For example, if the first up-stroke corresponds to counter-clockwise rotation of the crankshaft, the second up-stroke may correspond to clockwise rotation of the crankshaft, which may result in the piston successively approaching TDC from opposite sides of the piston's cyclical path. During the second up-stroke, piston position and (corresponding) cylinder pressure may also be measured by the pressure sensor and rotational encoder. As a result, a first data set from the first up-stroke may include pressure and corresponding piston position measurements for the piston's approach to TDC from one side, and a second data set from the second up-stroke may include pressure and corresponding piston position measurements for the piston's approach to TDC from the other side. As will be apparent from the discussion herein, pressure and position data does not necessarily need to be recorded over an entire piston stroke (and beyond). For example, in certain implementations, data may be recorded over only a fraction of a piston stroke.

Because various aspects of the behavior of the piston-cylinder system or assembly may be expected to be generally the same regardless of which direction the piston follows along its cyclical path, the first and second data sets (as described above) may also be expected to display various symmetric aspects (e.g., position-pressure curves that are generally symmetric with respect to each other). This may be particularly true if the first and second up-strokes are executed at approximately the same speed. Further, due to the inherent symmetry of the two piston strokes (i.e., the first and the second up-strokes, as discussed above), a center-of-symmetry of the two data sets may be viewed as corresponding to the exact (or near-exact) location of TDC. Accordingly, by determining a symmetric aspect of the two data sets (e.g., a symmetry of the position-pressure curve of the first data set with respect to the position-pressure curve of the second data set, as embodied, for example, by a line of reflection for the symmetric curves or a mid-point of one or more corresponding pressure-position data points from each data set), an exact (or near-exact) location of TDC for the tested piston may be determined.

Notably, the symmetric character of pressure traces from opposite-direction piston motion may facilitate identifying TDC even for engines with non-ideal piston-cylinder behavior. For example, it is well known that various piston-cylinder systems may exhibit gas leakage (e.g., pressure losses through leakage past piston rings, poorly sealed valves, and so on) and other flaws. These flaws (e.g., gas leakage), however, may be expected to affect the piston-cylinder system equally, regardless of the direction of travel of the piston along it cyclical path (e.g., regardless of whether the crankshaft is rotated clockwise or counterclockwise). As such, the symmetry-based analysis outlined herein may allow accurate determination of TDC even for non-ideal piston-cylinder systems.

Various other implementations may also be possible. In certain implementations, additional data sets may be compiled from additional piston strokes (or portions thereof). For example, following the second up-stroke noted above, a third up-stroke may be executed with the piston again advancing from near BDC toward TDC the first direction (e.g., again advancing toward TDC via counter-clockwise rotation of the crankshaft). Pressure and position measurements may be taken for the third up-stroke as part of a third data set (which may, in certain implementations, be combined with the first data set), and TDC may be determined based upon symmetric aspects of the third data set with respect to the second data set. Such a third (or other additional) piston stroke may, for example, allow a TDCM process to compensate for potential thermal (or other) effects of the piston motion. For example, the compression of the first and second up-strokes may cause the cylinder and piston to warm somewhat, which may have distorting effects on the pressure measurements recorded during the respective piston strokes (e.g., may cause a deviation from the expected symmetry between the two data sets). Executing additional piston strokes, with corresponding pressure and position measurements, may allow a TDCM process to compensate for this expected distortion. For example, a TDC position determined based on symmetric aspects of the first and second data sets (i.e., a TDC position determined at a lower cylinder temperature) may be averaged (or otherwise combined) with a TDC position determined based on symmetric aspect of the second and third data sets (i.e., a TDC position determined at a higher cylinder temperature) in order to obtain a more accurate assessment of actual TDC. Similarly, pressure and position data from the first and third data sets (i.e., from the two counter-clockwise rotations) may be averaged and then compared to pressure and position data from the second data set (i.e., from the clockwise rotation) in order to identify various symmetric aspects and, accordingly, the position of TDC. In this way, for example, the effects of increasing temperature over the course of the data collection may be appropriately accounted for.

In certain implementations, pressure indicators other than measurements of actual cylinder pressure may additionally (or alternatively) be utilized to identify symmetric aspects of various piston strokes and, accordingly, a location of TDC. For example, in certain embodiments, the torque required to progress the piston through various strokes may be recorded rather than (or in addition to) actual cylinder pressures. For example, a torque sensor on a servo motor used to progress the piston through various strokes may record the torque that is output by the servo throughout the piston strokes. Because this torque may be viewed as directly related to the cylinder pressure, the torque measurement may be utilized as a substitute for (or a source for deriving) cylinder pressure, in order to determine the symmetric aspects of the two (or more) piston strokes (or stroke portions).

Further, in certain implementations, pressure indicators (e.g., cylinder pressure, crankshaft torque, or another pressure-related factor) may be recorded during piston motion other than up-strokes (or portions thereof). For example, pressure indicators (as well as position measurements) may be recorded during two or more down-strokes (or portions thereof) of a piston. If the relevant cylinder is equalized to ambient (or another known) pressure at the beginning of the measured down-stroke (or portion thereof), such a pressure indicator may represent a (partial) vacuum with respect to the ambient (or other) pressure. As with the positive-pressure (i.e., up-stroke) implementation discussed above, if vacuum pressure (or related) measurements are recorded for piston motion on either side of an expected TDC position, symmetric aspects of the pressure (or related) measurements may also be identified, which may allow for the determination of an updated TDC position.

It will be understood that a TDCM method (or process) may be implemented in a variety of ways. A TDCM method may, for example, be implemented as a computer-implemented method (or process), as a computer system with hard-wired or software-based instructions, as a computer program product capable of causing one or more processing devices to execute various instructions, and so on. TDCM method may be implemented using one or more computing devices, such as one or more controllers (e.g., including various processors and associated memory architectures), which may be configured to receive and record measurement information from various encoders and sensors, control progression of one or more pistons of an engine through various portions of various piston strokes (e.g., through control of an electrical motor attached to an associated crankshaft), control the opening or closing of various cylinder valves, assess various data sets for symmetric aspects, and determine a TDC position accordingly. Such a controller (or other computing device) may be part of an engine or engine control system (e.g., part of an engine control unit ("ECU")), or may be separate from an engine or engine control system. For example, a dedicated controller forming part of a testing apparatus may be utilized to implement a TDCM method for various engines as the engines progress through the manufacturing process.

Referring now to FIG. 1, there is shown a schematic view of engine 10 and associated equipment, with which a TDCM method (or process) may be implemented. Engine 10 may be part of a vehicle (not shown) or other power installation, or may be undergoing a manufacturing, retrofit, or other operation. Engine 10 may include engine block 12, which may in turn include cylinder 14. For convenience, only a single cylinder of engine 10 is labeled in FIG. 1. It will be understood, in light of the discussion herein, that a TDCM method may also be implemented with respect to other cylinders of engine 10, including, in certain implementations, with respect to multiple cylinders at the same time. Engine 10 is depicted as an in-line four cylinder engine, with the first and fourth cylinders (and second and third cylinders) progressing through their respective cylinders in unison. It will be understood, however, that other configurations may also be possible.

Piston 16 may be configured to reciprocate along a cyclical path within cylinder 14, with piston rings 18 forming a dynamic seal between piston 16 and the walls of cylinder 14, and connecting rod 20 extending between piston 16 and crankshaft 22. Cylinder head 24 may be attached to engine block 12 to seal cylinder 14 (e.g., via various bolted connections (not shown)), and may include various valves, such as intake valve 28 and exhaust valve 30. For clarity, valves 28 and 30 are presented side by side from the perspective of FIG. 1. It will be understood, however, that these valves may actually be arranged differently (e.g., along a single line perpendicular to the plane of FIG. 1, as depicted in FIG. 2). Further, it will be understood that various cylinders may be equipped with various numbers of valves. Certain cylinders, for example, may include two intake valves and two exhaust valves, and so on. Head 24 may also include port 32, such as a port for a spark plug or fuel injector for cylinder 14.

In order to implement a TDCM method, engine 10 may be equipped and instrumented in various ways. As noted above, engine 10 may be equipped with a mechanism to progress piston 16 along various piston strokes within cylinder 14, a sensor to measure various pressure indicators, a position sensor, and so on. As depicted in FIG. 1, for example, rotational encoder 38 (e.g., a high precision optical encoder) may be mounted to the front end of crankshaft 22, in order to measure the relative rotation of crankshaft 22 (and thereby, indirectly, the relative position of piston 16).

A sensor to measure a pressure indicator for cylinder 14 may also be included. For example, pressure sensor 34 may be mounted within (and completely seal) port 32 in order to measure the pressure within cylinder 14 at various times. In certain implementations, however, other sensors may be utilized to capture pressure indicators, including through measurement of non-pressure parameters. For example, port 32 may be sealed with a plug (or other object or device) and a torque sensor (not shown) may record the torque required to progress piston 16 along a stroke within cylinder 14. Because this torque may be expected to correlate with cylinder pressure (which resists the movement of the piston), it may be recorded as a pressure indicator and utilized (e.g., as outlined above) in the determination of TDC.

A power source (e.g., servo motor 40) may be mounted to crankshaft 22, or otherwise configured to provide motive power to piston 16. A controller or other computing device (e.g., controller 36) may receive (and/or provide) signals to various components of the depicted system (e.g., encoder 38, sensor 34, servo 40, and so on), and may be configured to perform various calculations with the received information.

As depicted in FIG. 1, cam shaft(s) 26 may be in place in cylinder head 24, and may be utilized to activate valves 28 and 30 at various points during a TDCM method (e.g., to equalize the pressure of cylinder 14 with ambient pressure at various times). In certain implementations, cam shaft(s) 26 may not be in place or may not be configured to actually activate valves 28 and 30. For example, in certain implementations a TDCM method may be executed with springs, but not rocker arms, installed with respect to valves 28 and 30. As such, in order to equalize pressure in cylinder 14 at various times (e.g., between a first and a second up-stroke of piston 16), various other actuating mechanisms may be utilized to actuate the valves. For example, solenoid actuators or other mechanisms (not shown) may be configured to separately actuate valves 28 and 30 based upon a signal from controller 36, in order to equalize pressure in cylinder 14 at appropriate times.

Referring also to FIGS. 2A-2D, aspects of a progression of a piston in a TDCM method are presented. For clarity, the various components depicted in FIGS. 2A-2D (and in FIGS. 3A-3D) are numbered only in FIG. 2A (and FIG. 3A). Likewise, in contrast to the simplified schematic of FIG. 1, valves 28 and 30, which control flow of gases between cylinder 14 and, respectively, intake port 42 and exhaust port 44, are depicted as side by side from the perspective of FIGS. 2A-2D (and FIGS. 3A-3D), with corresponding cam shafts 26a and 26b. As also noted above, in certain implementations cam shafts 26a and 26b may not be installed for execution of a TDCM method, or may not be configured to actually control the motion of valves 28 and 30.

Figure 2A:
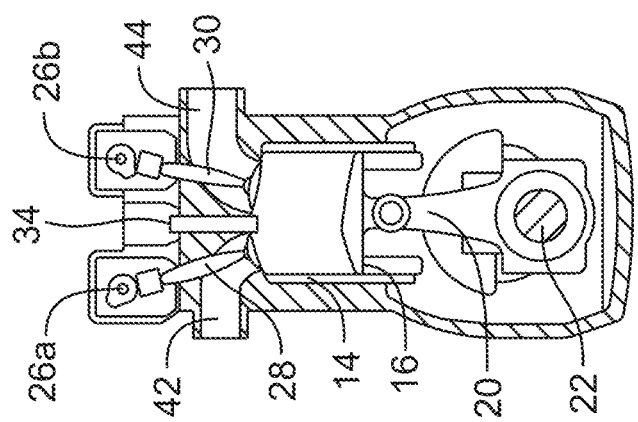
FIGS. 2A-2D are diagrammatic views of a piston and cylinder of the example engine of FIG. 1, during implementation of certain aspects of the disclosed system and/or method.
Figure 2B:
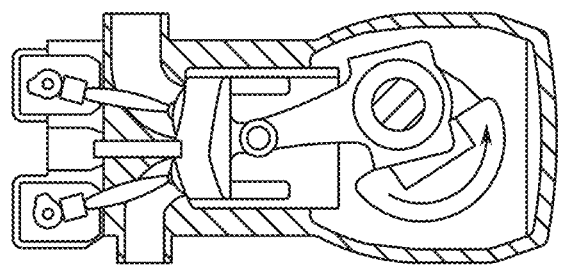

In order to compile a first data set of position and pressure indicator information for cylinder 14, piston 16 may be positioned near BDC (as depicted in FIG. 2A). In certain implementations, piston 16 may be positioned slightly to one side of BDC (e.g., with respect to the normal cyclical motion of the piston during operation). Crankshaft 22 may then be motored (or otherwise turned) in a first direction (e.g., counterclockwise, as depicted in FIGS. 2A-2D). As shown in FIG. 2B, this may initially cause piston 16 to progress along an up-stroke toward TDC. During a portion of the first-direction up-stroke, pressure indicator data and corresponding position data may be recorded (e.g., by controller 36, based upon sensor 30 and encoder 38). As discussed in greater detail below, pressure and position data may, but need not necessarily, be recorded for the entire path of the piston along this first up-stroke.

Figure 2C:
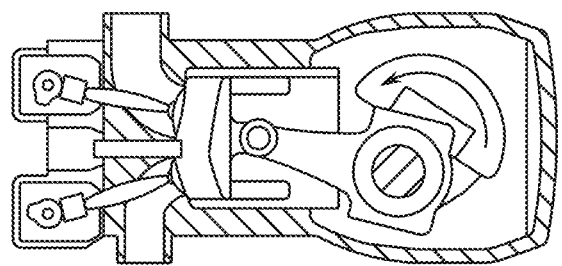
Figure 2D:
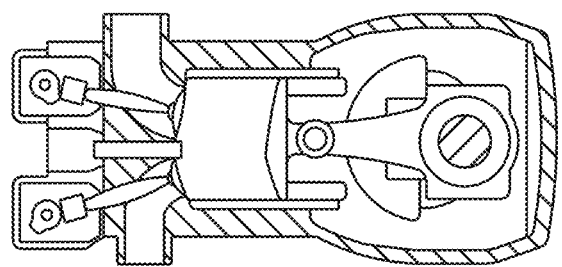

First-direction (e.g., counterclockwise) rotation of crankshaft 22 may then continue, causing piston 16 to pass TDC (e.g., as depicted in FIG. 2C) and continue on toward a final position near BDC (e.g., as depicted in FIG. 2D). In certain implementations, one or both of valves 28 and 30 may be opened before (or at or near) the start of data capture for the first-direction piston stroke, in order to ensure that cylinder 14 is at a consistent reference pressure at the start of relevant compression. In certain implementations, this valve opening may occur at the end of data capture in the first-direction piston stroke, just prior to a subsequent second-direction piston stroke, or at another time or times.

Figure 3D:
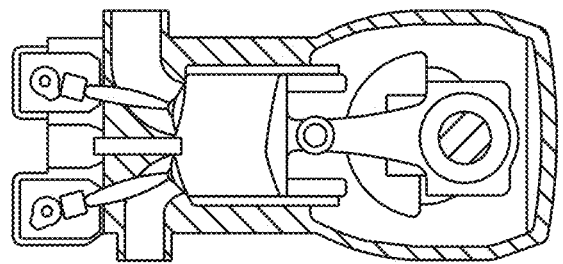
FIGS. 3A-3D are diagrammatic views of a piston and cylinder of the example engine of FIG. 1, during implementation of certain other aspects of the disclosed system and/or method.
Figure 3C:
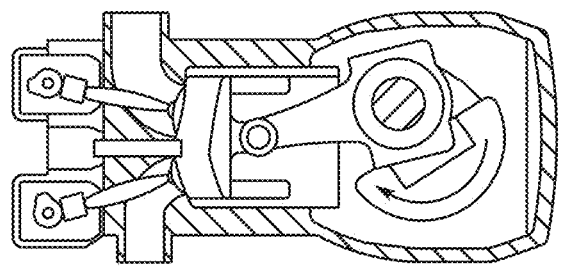
Figure 3B:
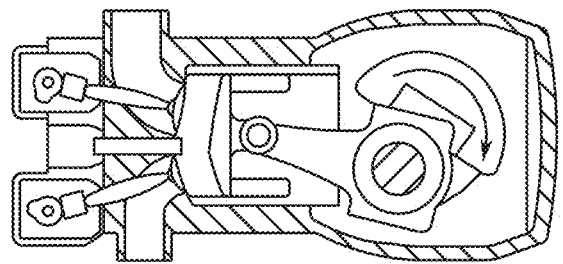
Figure 3A:
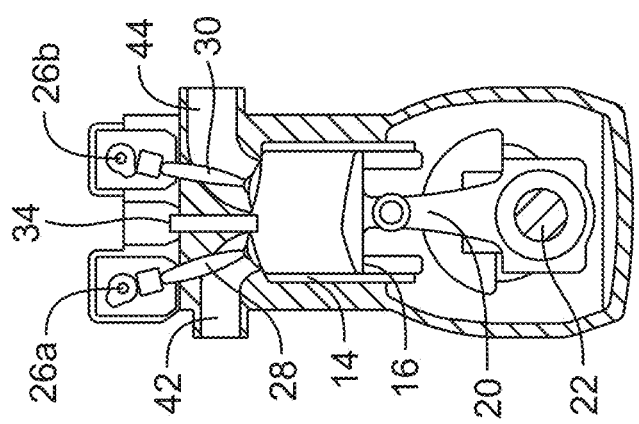

Referring now also to FIGS. 3A-3D, in order to compile a second data set of position and pressure indicator information for cylinder 14, piston 16 may again be positioned near BDC (as depicted in FIG. 3A). In certain implementations, piston 16 may be positioned slightly to another side of BDC (with respect to the normal cyclical motion of the piston during operation). In certain implementations, this positioning may correspond with the end of the first-direction (e.g., counterclockwise) rotation. For example, the first-direction rotation may move the piston from one side of BDC through an up-stroke to TDC, past TDC, and through a down-stroke to the other side of BDC. Crankshaft 22 may then be motored (or otherwise turned) in a second direction (e.g., clockwise, as depicted in FIGS. 3A-3D). In certain implementations, the second-direction progression of piston 16 may be effected at approximately the same rate (e.g., with approximately the same motoring speed provided by servo motor 40) as the above-described first-direction progression of piston 16. In this way, the effects of any thermal or gas-leakage losses of pressure (e.g., through leaks around piston rings 18, across faulty seals at valves 28 and 30, and so on) may be roughly the same for both of the piston movements.

As shown in FIG. 3B, the second-direction motoring (or other turning) of crankshaft 22 may initially cause piston 16 to progress along an up-stroke toward TDC, but from a different side of TDC than in the first-direction progression of the piston (as discussed above). During a portion of the second-direction up-stroke, pressure indicator data and corresponding position data may be recorded (e.g., by controller 36, based upon sensor 30 and encoder 38). As discussed in greater detail below, pressure and position data may, but need not necessarily, be recorded for the entire path of the piston along this second up-stroke.

Second-direction (e.g., counterclockwise) rotation of crankshaft 22 may then continue, if desired, causing piston 16 to pass TDC (e.g., as depicted in FIG. 3C) and continue on toward a final position near BDC (e.g., as depicted in FIG. 3D). In certain implementations one or both of valves 28 and 30 may be opened after (or at or near) the end of data capture for the second-direction piston stroke, in order to equalize cylinder 14 with an ambient (or other) pressure.

In certain implementations, a third data set may then be compiled, based upon progressing piston 14 again through the path depicted in FIGS. 2A-2D. For example, if thermal effects (e.g., effects resulting from the heating of various engine components due to the compression of gas in the various preceding piston strokes) are expected to skew TDC analysis, the first-direction piston progression and associated data capture may be repeated. In such a case, the later first-direction progression may be expected to occur at a higher system temperature than the second-direction progression (due to the combined heating effects of the second-direction progression and the earlier first-direction progression) and the earlier first-direction progression may be expected to occur at a lower system temperature than the second-direction progression. Accordingly, by determining symmetric aspects of the recorded data with respect to various combinations of the first, second and third data sets, it may be possible to cancel out (to varying degrees) any distorting thermal effects. In certain implementations, for example, data from the first and third data sets (i.e., pressure indicator and position data from the two first-direction piston progressions) may be averaged before being compared to data from the second data set (i.e., pressure indicator and position data from the second-direction piston progression). In other implementations, for example, data from the first and third data sets may be compared independently with data from the second data set, and the two resulting TDC position determinations averaged (or otherwise combined) in order to provide a single TDC assessment.

It will be understood that "first," "second," "third," and so on are used only as labels of convenience for the data recorded during the various piston progressions. Depending on the particular implementation of a TDCM method, for example, these data sets may be stored together, separately, and/or in various combinations. Likewise, it will be understood, in light of the discussion herein, that various additional piston progressions may be executed (and associated data sets recorded) in order to address various thermal (and other) effects. For example, in certain implementations a subsequent second-direction piston progression may be executed, resulting in a fourth data set of pressure indicator data and position data, to be combined and analyzed with the other data sets in various ways.

Still referring to FIGS. 2A-2D and 3A-3D, in certain implementations a relative vacuum in cylinder 14 may be used in addition (or as an alternative) to positive pressure (as discussed above). For example, pressure indicator data and position data may be collected as piston 16 travels in along a down-stroke (e.g., from FIGS. 2C to 2D or FIGS. 3C to 3D). In such a case, for example, one or more of valves 28 and 30 may be opened near TDC to equalize pressure in the piston with ambient pressure, then closed so that as piston 16 progresses away from TDC toward BDC (in either of the first- or second-directions), a relative vacuum is created in cylinder 14 with respect to ambient pressure. This vacuum may be measured (e.g., by a torque sensor (not shown), pressure sensor 34, or another sensor) and recorded, along with corresponding position measurements (e.g., from encoder 38), in various relevant data sets. As above, when using relative vacuum to inform pressure indicator readings, it may be useful to progress piston 16 in the various directions of travel at approximately the same speed. Likewise, it may be useful to execute various progressions in either of the first or the second directions and average (or otherwise combine) the resulting data, in order to compensate for thermal (or other) effects.

Figure 4:
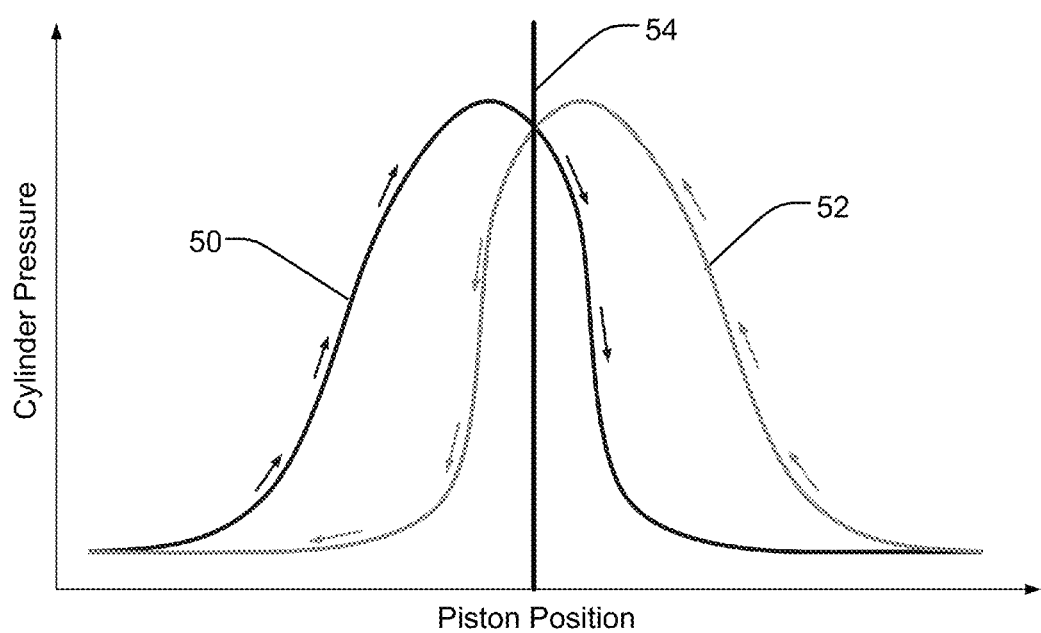
FIGS. 4-7 are graphical views of various modeling approaches associated with the disclosed system and/or method and the example engine of FIG. 1.
Figure 5:
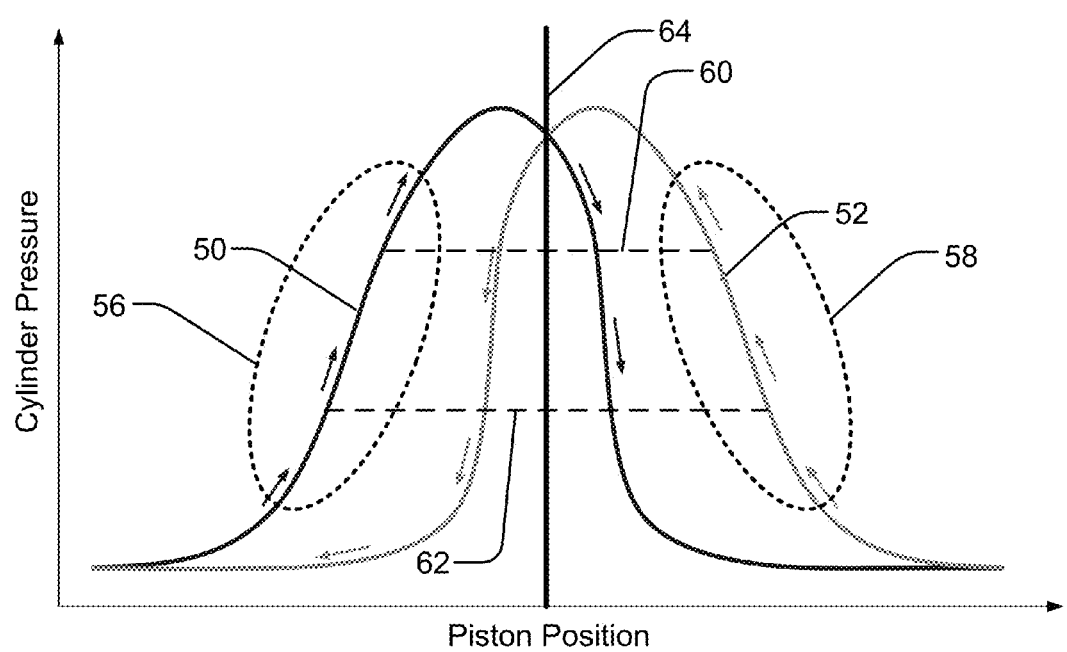

Referring also to FIG. 4, example pressure indicator (e.g., pressure) and position (e.g., piston position, based upon relative encoder position) data is presented. For example, in a first-direction piston progression (e.g., as described above), position and pressure data may be recorded, which may be plotted as curve 50. Likewise, in a second-direction piston progression (e.g., as described above), position and pressure data may be recorded, which may be plotted as curve 52. Arrows near curves 50 and 52 indicate the sequence of recording of the data of the respective curves (i.e., the progression of the piston across the relevant piston positions over time). It will be understood that these arrows are provided by way of example only, and that piston 16 may be progressed in other directions, in various implementations. It will also be understood that the analysis implemented through a TDCM method may not necessarily utilize actual plotting of data, as depicted in FIG. 4 (and FIGS. 5-7). In this light, the graphical representations of these figures may be viewed as an aid to understanding the analysis, rather than necessarily indicating a graphical, geometrical or other particular type of computation.

It will be understood that either (or both) of curves 50 and 52 may represent data from a single piston progression, or may represent averaged (or otherwise combined) data from multiple piston progressions. Likewise, it will be understood (as discussed in greater detail below), that data need not necessarily be collected over an entire piston cycle or stroke. For example, curves 50 and 52 (as depicted in FIG. 4) may be viewed as representing pressure (or pressure indicator) and position data for piston 16 over a progression from near BDC, through TDC, to near BDC again, with no equalization of cylinder pressure to ambient pressure between the two near-BDC positions. However, in certain implementations, data may be recorded (or analyzed) only with respect to a portion of such a progression, and cylinder 14 may be equalized with ambient pressure at various points in time. Further, alternatives to curves 50 and 52 (or similar curves) may indicate relative vacuum in cylinder 14 (with respect to ambient), rather than positive pressure.

As also noted above, because the pressure behavior of the piston-cylinder system(s) of engine 10 may be expected to be symmetric with respect to piston direction (i.e., may be expected not to vary depending on the direction from which TDC is approached by piston 16), curves 50 and 52 may be expected to exhibit various symmetric aspects with respect to TDC. For example, as can be seen in FIG. 4, curve 50 (representing pressure and piston position data from the first-direction progression(s)) may be symmetric with curve 52 (representing pressure and piston position data from the second-direction progression(s)) about line of symmetry 54. In light of the expected symmetry of the piston-cylinder system behavior, therefore, the intersection of line 54 (i.e., the line of symmetry of curves 50 and 52) with the piston position axis may be viewed as representing the actual location of TDC. Accordingly, the location of TDC may be determined by determining one or more symmetric aspects of the various pressure and position data sets (e.g., as embodied by curves 50 and 52).

Symmetric aspects of the various data sets (and, accordingly, a precise location of TDC) may be determined in a variety of ways, using various known mathematical/computational techniques. For example, with respect to FIG. 4, line 54 may be identified based upon identifying the intersection point of curves 50 and 52, identifying an average position of corresponding pressures between curves 50 and 52, and so on.

As also noted above, in certain implementations, pressure indicator and position data may not necessarily be recorded over a range of piston motion, and curves 50 and 52 may not necessarily intersect. For example, referring also to FIG. 5, data may sometimes be collected only during the portion of the various piston progressions (e.g., the various piston up-strokes) indicated by regions 56 and 58. As such, it may not necessarily be possible to easily (or accurately) identify an intersection point of curves 50 and 52. In such a case (or others), various other procedures for determining symmetric aspects of the various pressure-position data sets may be utilized. For example, lines 60 and 62, each parallel to the piston position axis, may be determined to extend between corresponding pressures on curves 50 and 52 (which corresponding pressures may be considered, therefore, as symmetric aspects of the curves). The midpoint of one (or both) of lines 60 and 62, or an average of the midpoints of each line (and, potentially, other similar lines (not shown)), may then be determined, with a line projected perpendicularly downward therefrom (i.e., line 64) indicating the position of TDC with respect to the piston position axis. Such a computation (or others) may be executed in a variety of ways, including through arithmetically (e.g., through numerical averaging of endpoints of lines 60 and 62), geometrically (e.g., through geometrical identification of midpoints of lines 60 and 62), or otherwise.

Figure 6:
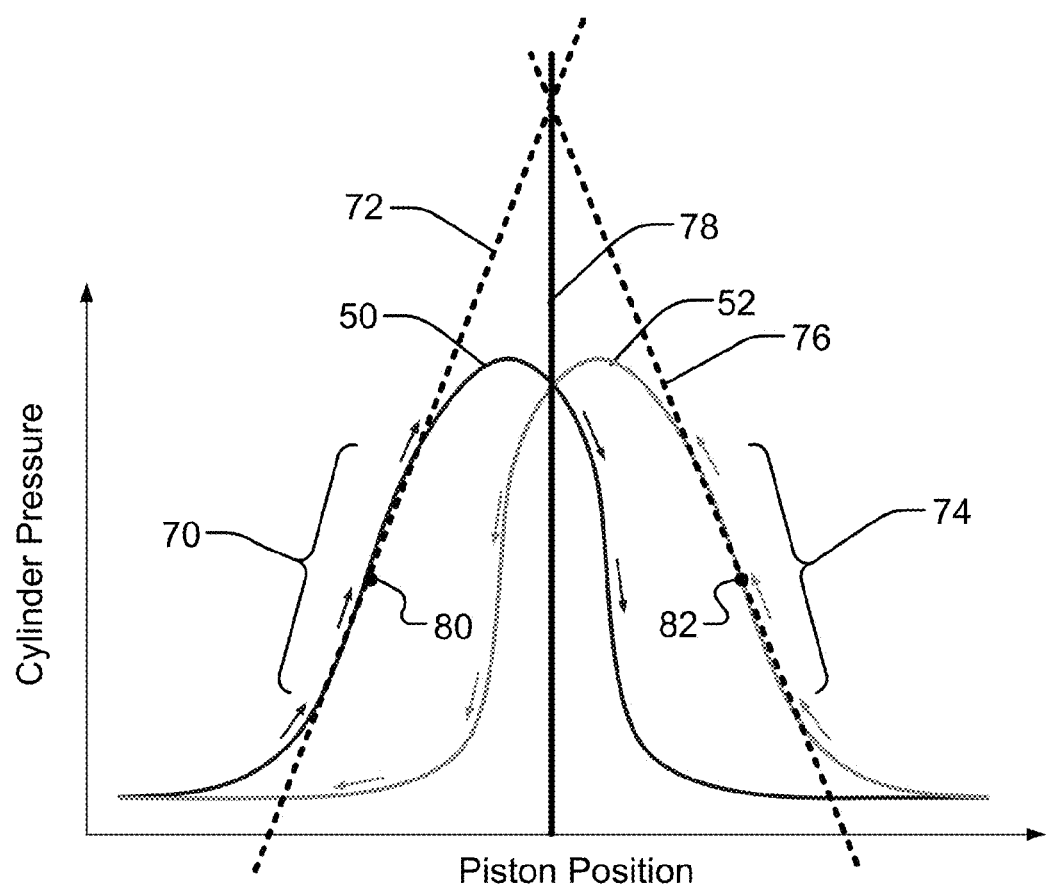

As another example, referring also to FIG. 6, various linear extensions of curves 50 and 52 may be determined, and these extensions utilized to determine a position of TDC. For example, near-linear portion 70 of curve 50 may be determined and then computationally extended along best-fit line 72, while near-linear portion 74 of curve 52 may be determined and then computationally extended along best-fit line 76. Lines 72 and 76 may then be analyzed in order to determine TDC. For example, the intersection of lines 72 and 76 may be extended downward to the piston position axis (i.e., along line of symmetry 78) in order to indicate TDC, or the midpoint of the intersection of lines 72 and 76 with the piston position axis may be determined, for the same purpose. Similarly, in certain implementations, tangent lines may be computed extending from corresponding points on each of curves 50 and 52, with the intersection of these tangent lines also indicating TDC. For example, inflection points 80 and 82 of curves 50 and 52, respectively, may be determined and corresponding tangent lines (e.g., lines 72 and 76, respectively) computed for curves 50 and 52. The intersection of these lines (or the midpoint of their intersection with the position axis) may then also indicate TDC.

To reiterate, although certain discussion herein is presented with respect to "curves" determined from the various pressure indicator and position data sets, it will be understood that TDC may be similarly identified without necessarily constructing these curves. For example, numerical analysis may be conducted on the raw (or adjusted) data itself, as drawn from the various data sets, to similarly identify symmetric aspects of the data and, correspondingly, an updated TDC location.

Figure 7:
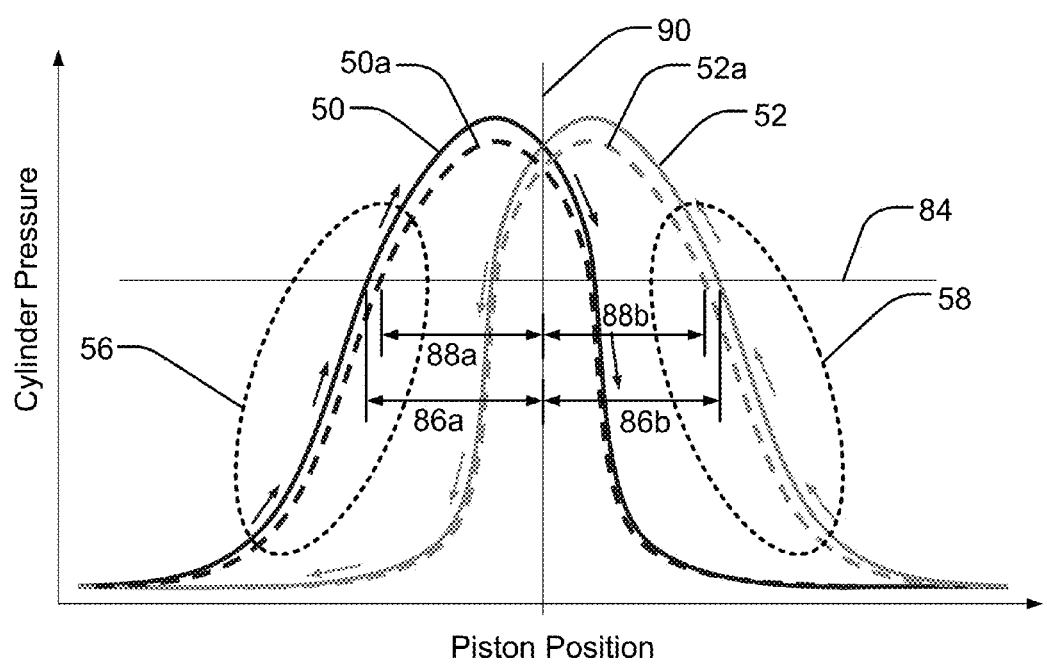

Referring also to FIG. 7, position-pressure curves and related TDC analysis are presented for a cylinder with leakage issues. In FIG. 7, curves 50 and 52 may represent pressure-position data for progression of a piston within a cylinder with no (or negligible) gas leakage and curves 50a and 52a may represent pressure-position data for similar progression of a piston within a cylinder with non-negligible leakage. It may be seen that this leakage causes curves 50a and 52a to fall generally below curves 50 and 52 (i.e., because the leakage generally reduces the cylinder pressure throughout the piston progressions). As in examples above, in FIG. 7, regions 56 and 58 may indicate example portions of a piston progression for which pressure indicator and position data is actually recorded.

As can be seen in FIG. 7, because the effects of leakage from the cylinder are generally symmetrical (i.e., may be expected to be independent of the direction of travel of a piston along the piston's cyclical path), determining TDC based upon symmetric aspects of the various pressure-location data sets may indicate the same TDC location regardless of the degree of cylinder leakage. For example, with respect to a reference pressure (e.g., as indicated by pressure line 84), the midpoint of curves 50 and 52 (i.e., as indicated by dimensions 86a and 86b) may be the same as the midpoint of curves 50a and 52a (i.e., as indicated by dimensions 88a and 88b). Accordingly, the same location of TDC may be determined from either set of curves (i.e., 50 and 52 or 50a and 52a), as indicated by the intersection of line of symmetry 90 with the position axis.

Figure 8:
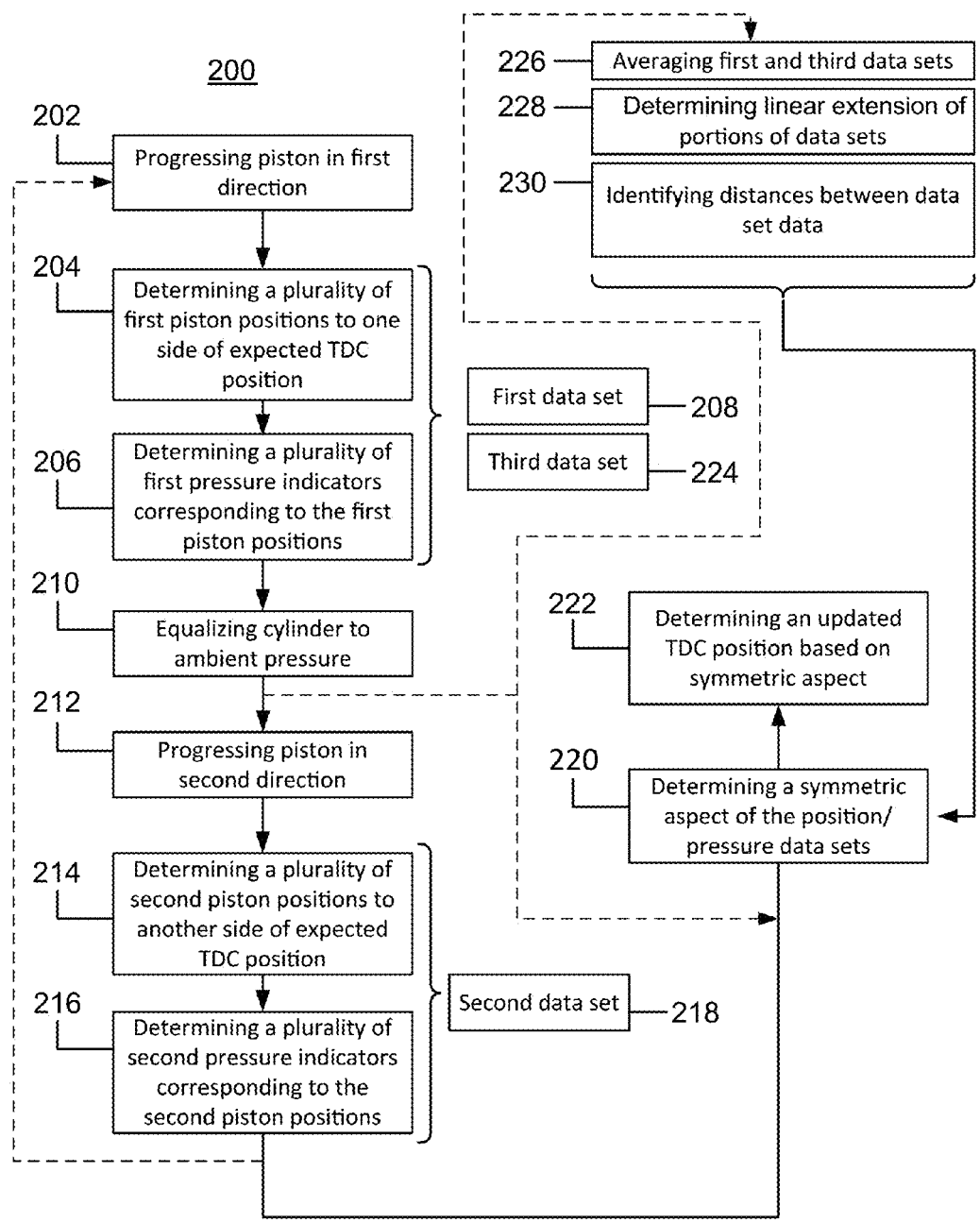
FIG. 8 is a process diagram of aspects of the disclosed system and/or method.

As also noted above, a TDCM method (or process) may be implemented in a variety of ways, including through software, hardware, or other systems. Referring also to FIG. 8, various aspects of on computer-implemented implementation of a TDCM method (e.g., TDCM method 200) are presented.

TDCM method 200 may, for example, include progressing 202 a piston in a first direction. For example, a servo motor or other mechanism may provide a motive force to a crankshaft associated with a piston, thereby progressing 202 the piston along its cyclical path in a first direction.

Method 200 may include determining 204 a plurality of piston positions for the first-direction progression, with the positions falling on at least one side of an expected TDC. As noted above, although the exact TDC location may not be known in advance, the approximate TDC location may be determined based upon manufacturing specifications, visual inspection, or other factors. Method 200 may include determining 204 a plurality of piston positions for the first-direction progression, with the positions falling to one side of this expected TDC location. Method 200 may include determining 204 a plurality of piston positions based upon a variety of sensor data (e.g., data from an optical rotational encoder attached to the engine crankshaft).

Method 200 may further include determining 206 a plurality of pressure indicators (e.g., pressure, torque, and so on) corresponding to the plurality of piston positions for the first-direction progression. In certain implementations, cylinder pressure may be determined 206 directly. For example, a pressure sensor may be seated in a spark plug or fuel injector port in order to sense the pressure within the relevant cylinder. In certain implementations, cylinder pressure indicators may be determined 206 based on non-pressure data. For example, the torque required to progress the piston (e.g., as provided by an associated servo motor) may be determined 206 as a pressure indicator. Pressure indicator and position data may be determined 206, 204 continuously or discretely, and may be determined 206, 204 for all or part of a relevant piston progression. The determined 204, 206 positions and pressure indicators may be recorded as part of first data set 208.

Method 200 may further include equalizing 210 the relevant cylinder to an ambient pressure (or other reference pressure). Such an equalization may be effected by actuating cylinder valves (e.g., exhaust or intake valves) or otherwise, and may occur at various points in a piston progression. For example, pressure may be equalized 210 at the end of collecting pressure indicator and position data for a particular progression, before collecting such data for another progression, when the piston is at or near an expected TDC position, when the piston is at or near BDC, and so on.

Method 200 may further include progressing 212 a piston in a second direction. For example, a servo motor or other mechanism may provide a motive force to a crankshaft associated with a piston, thereby progressing 212 the piston along its cyclical path in a second direction that is different from the above-noted first direction.

Method 200 may include determining 214 a plurality of piston positions for the second-direction progression, with the positions falling on at least one side of an expected TDC. As noted above, although the exact TDC location may not be known in advance, the approximate TDC location may be determined based upon manufacturing specifications, visual inspection, or other factors. Method 200 may include determining 214 a plurality of piston positions for the second-direction progression, with the positions falling to the other side of this expected TDC location than positions determined 204 for a preceding (or other) first-direction progression. Method 200 may include determining 214 a plurality of piston positions based upon a variety of sensor data (e.g., data from an optical rotational encoder attached to the engine crankshaft).

Method 200 may further include determining 216 a plurality of pressure indicators (e.g., pressure, torque, and so on) corresponding to the plurality of piston positions for the second-direction progression. In certain implementations, cylinder pressure may be determined 216 directly. For example, a pressure sensor may be seated in a spark plug or fuel injector port in order to sense the pressure within the relevant cylinder. In certain implementations, cylinder pressure indicators may be determined 216 based on non-pressure data. For example, the torque required to progress the piston (e.g., as provided by an associated servo motor) may be determined 216 as a pressure indicator. Pressure indicator and position data may be determined 216, 214 continuously or discretely, and may be determined 216, 214 for all or part of a relevant piston progression. The determined 214, 216 positions and pressure indicators may be recorded as part of second data set 218.

In certain implementations, method 200 may also include determining additional data. For example, method 200 may again progress 202 the piston in the first direction and determine 204, 206 corresponding position and pressure indicator data. This data may be recorded, for example, as part of third data set 224, which may be separate from or included in first data set 208.

Method 200 may then include determining 220 a symmetric aspect of the various recorded data sets, in various combinations. For example, method 200 may include determining 220 a symmetric aspect of first data set 208 with respect to second data set 218, of third data set 224 with respect to second data set 218, of a combination of first and third data sets 208 and 224 (e.g., based upon averaging 226 the two data sets) with respect to second data set 218, and so on. Determining 220 a symmetric aspect of the various data sets may take a variety of forms. In certain implementations, determining 220 a symmetric aspect of the data sets may include identifying various intersection points for the various data sets 208, 218 and 224, may include identifying 228 linear extensions of the data sets (e.g., linear approximations of portions of the data sets or tangent-line extensions of the data sets, and so on), may include identifying 230 distances between portions of the data sets or extensions thereof (e.g., through various tangent lines), and so on.

As noted above, combining data from various same-direction piston progressions (e.g., through averaging 226 of first and third data sets 208, 224) may assist in compensating for temperature (and other) effects of the various piston progressions. For example, at the start of the initial first-direction progression the relevant engine may be cold, but the engine may be heated somewhat by the associated compression (or cooled by an expansion, as may occur in a vacuum-based analysis). As such, in the initial second-direction progression the engine may be warmer (or cooler) and may warm (or cool) even more due to the compression (or expansion) of the second-direction movement. Finally, in a subsequent first-direction progression, the engine may warm (or cool) still further. As such, by averaging or otherwise combining pressure and position data (or determined TDC positions) for the two first-direction progressions, temperature effects may be appropriately compensated for.

With various symmetric aspects having been determined 220, method 200 may then determine 222 an updated TDC position (i.e., updated with respect to the nominal or expected TDC position) for the tested piston. For example, method 200 may include identifying the piston position corresponding to an identified intersection of data set curves, to an identified intersection of linear extensions of the data set curves, to an identified midpoint of lines extending between corresponding (e.g., symmetrically aligned) points on the data set curves, and so on. This piston position may then be viewed as an indicator of TDC for the relevant piston.

In certain implementations, a TDCM method (e.g., method 200) may be implemented as part of a production or manufacturing process. For example, a TDCM method may be implemented after an engine block has been built with piston and valves and the cylinder head bolted on, but before rocker arms, fuel injectors, spark plugs, or other components have been installed. In certain implementations, the relevant engine may be secured in place during testing. Due to the nature of the data determined (and utilized) by a TDCM method, however, it may not be necessary to secure the engine in this way. For example, because piston position may be determined relative to the engine block with an encoder attached to the crankshaft (or otherwise) and pressure measurement may be expected to be independent of bulk engine movements, the relevant engine may be left somewhat movable (e.g., suspended by chains or a "J" hook, and so on) during TDCM method implementation.

It will be understood, based upon the discussion above, that a more precise determination 204, 214 of piston positions may lead to more precise determination 222 of an updated TDC position. As such, high precision encoders may sometimes be utilized. For example, optical encoders with 16,384 (or more) measurement points per revolution may allow for determination 222 of TDC with an accuracy of 0.022 degrees (or better). Other sensors (e.g., magnetic pick-up sensors) may also be utilized, to replace or supplement such an optical encoder.

In certain implementations, a TDCM method may be implemented successively (or simultaneously) with respect to a number of pistons within a particular engine in order to determine TDC for each of the pistons. If desired, each of these TDC locations may then be averaged or otherwise combined to provide one or more generalized TDC location(s) for the relevant engine or groups cylinders contained therein. In a multiple cylinder engine, for example, a TDCM method may be implemented simultaneously with respect to pairs of corresponding (or other) cylinders. For example, in a multi-cylinder engine, two (or more) cylinders may generally progress through the same cyclical motion at the same time (i.e., may progress through synchronized up-strokes and down-strokes). As such, a TDCM method may be executed simultaneously with respect to each such pair (or group) of cylinders. For example, pressure sensors may be installed in injector or spark plug ports for each cylinder of the engine, the pistons progressed appropriately, and pressure indicator data for multiple cylinders recorded simultaneously.

There has thus been described multiple embodiments of a method for determining TDC of a reciprocating piston in a highly accurate and reliable manner. Embodiments of the TDCM method are carried-out by collecting and analyzing data sets correlating measurements indicative of cylinder pressure (more briefly, "pressure indicator measurements") with measurements indicative of piston position (more briefly, "piston position measurements"). As previously explained, and as reiterated below, the pressure indicator measurements may include pressure sensor data provided by a pressure sensor fluidly coupled to a combustion chamber, crankshaft torque measurements received from a motor servo or other torque sensor, and/or other sensor data that is directly or indirectly reflective of the pressures generated within a cylinder through an entire or partial stroke range of the associated piston. By comparison, the piston position measurements may include crankshaft angle measurements or other sensor data from which the translational position of a piston may be determined.

Significantly, analysis of the data sets described herein may also yield other important information pertaining to the tested reciprocating piston engine. This information may include, for example, the cylinder health or efficiency of one or more piston-cylinder assemblies included within the engine. As appearing herein, the term "cylinder health" refers to the ability of a piston-cylinder assembly to effectively compress intake air (and the fuel-air mixture) prior to combustion and, after combustion, to convert the combustive activity (specifically, the rapid expansion of combustive gasses) to piston movement and useful power. Similarly, the term "cylinder health characteristic," as appearing herein, refers to a characteristic or attribute of a piston-cylinder assembly affecting cylinder health, as previously defined. Cylinder leakage characteristics (that is, the propensity of the piston-cylinder assembly to permit gas leakage under high pressure operating conditions) is an example of a cylinder health characteristic. Cylinder leakage characteristics are not, however, exclusively determinative of cylinder health. Instead, cylinder health may also be affected by other characteristics of a tested piston-cylinder assembly, such as variations in the geometry and dimensions of the cylinder assembly combustion chamber. For example, in the case of a piston including a piston bowl (as common in diesel engines), variations in the shape and capacity of the piston bowl may affect the characteristics of the pressure wave generated by translational movement of the piston within the cylinder, as described more fully below. Still other factors that may affect cylinder health include, but are not limited to, thermal performance characteristics of the tested piston-cylinder assembly.

Examples of different techniques for evaluating overall cylinder health or characteristics contributing to cylinder health (e.g., cylinder leakage characteristics) are described in detail below. As embodiments of the below-described cylinder health assessment process may involve analysis of data sets similar or identical to those collected during the above-described TDCM process, the cylinder health assessment process may be conveniently performed in conjunction with the TDCM process. For example, in certain implementations, a computer system may execute a specialized application or program that performs both methods or processes in parallel or in rapid succession. Such an implementation may serve as a powerful diagnostic and quality control tool for usage during original manufacture (e.g., prior to end of assembly line testing of an engine), during engine refurbishment, or during the performance of diagnostic and repair services. It should be understood, however, that identification of the TDC piston position may be unnecessary in embodiments of the cylinder health assessment process. Consequently, the below-described cylinder health assessment process may be performed independently of the TDCM process, if so desired.

During the cylinder health assessment process, various different data analysis techniques may be employed to determine the cylinder heath of one or more piston-cylinder assemblies within a tested engine. As before, analysis of the data sets may entail identification of at least one symmetric aspect shared by multiple data sets. In one implementation, identification of the symmetric aspect includes a determination of a piston position measurement corresponding to a maximum or peak cylinder pressure for at least first and second data sets. Absent the occurrence of a fault condition during testing, the behavior of the piston-cylinder assembly will remain substantially constant or uniform regardless of the particular direction the piston is progressed along its cyclical motion path. As a result, it may be expected that the peak pressure for the first data set (as collected over a first direction piston progression) and the peak pressure for the second data set (as collected over a second, opposing direction piston progression) will be substantially equivalent. In the case of an idealized, adiabatic piston-cylinder assembly, the peak pressures for the first data set and the second data set would overlap perfectly. However, for a real world, non-idealized piston-cylinder assembly, the piston position measurements at the peak cylinder pressures between the first and second data sets will vary or diverge in relation to cylinder health. In certain cases, the disparity between the piston position measurements at the respective peak pressures of the first and second data sets may be substantially inversely proportional to cylinder health. Thus, in embodiments wherein the first and second data sets are graphically expressed or plotted as position-pressure curves, such as those shown in FIGS. 10 and 11 (described below), cylinder health will typically decrease as the peaks of the curves diverge or spread apart, as along the axis representative of the piston position measurements.

After a particular value of the cylinder health characteristic has been established, the cylinder health characteristic may then be compared to predetermined acceptance criteria to determine whether the piston-cylinder assembly should pass testing. Consider, for example, an embodiment wherein the disparity in piston position measurements is expressed as a differential in the rotational or angular position of the crankshaft at the peak pressures (referred to herein as the "tested crankshaft angle differential"). In this case, the cylinder health characteristic may be compared to a maximum acceptable crankshaft angle differential. If the value of the resulting cylinder health characteristic satisfies the acceptance criteria (e.g., the tested crankshaft angle differential is less than the maximum acceptable crankshaft angle differential), the piston-cylinder assembly may pass testing and a corresponding accept cue (e.g., a visual or audible notification) may be generated by a computer system utilized to carry-out the cylinder health assessment process. Conversely, if the value of the cylinder health characteristic fails to meet the acceptance criteria, the piston-cylinder assembly may fail testing and a reject cue may be generated by a computer system to notify personnel of the faulty piston-cylinder assembly.

In further embodiments, additional data analysis may be performed during the cylinder health assessment process. For example, the magnitude of the peak cylinder pressure recorded in the first data set ($CP_{PEAK1}$) and in the second data set ($CP_{PEAK2}$) are determined. $CP_{PEAK1}$ will typically be substantially equivalent to $CP_{PEAK2}$ due to the symmetric behavior of the piston-cylinder assembly. As a result, it will typically be the case that the average of these two peak pressures ($CP_{PEAK1-2\_AVG}$) is equivalent to both $CP_{PEAK1}$ and $CP_{PEAK2}$. However, averaging $CP_{PEAK1}$ $CP_{PEAK2}$ and C may help compensate for slight variations between these values that may occur due to limitations inherent in the testing process, thermal effects, and the like. $CP_{PEAK1-2\_AVG}$ may then be compared to an expected value ($CP_{PEAK\_EXPECTED}$) representing a target peak pressure value normalized to the test conditions (e.g., speed of crankshaft rotation, the starting pressure within the combustion chamber, engine temperature, etc.). The absolute difference between these values ($CP_{PEAK1-2\_AVG}$ and $CP_{PEAK\_EXPECTED}$) may then be utilized to determine or refine the cylinder health assessment, as described more fully below.

Figure 9:
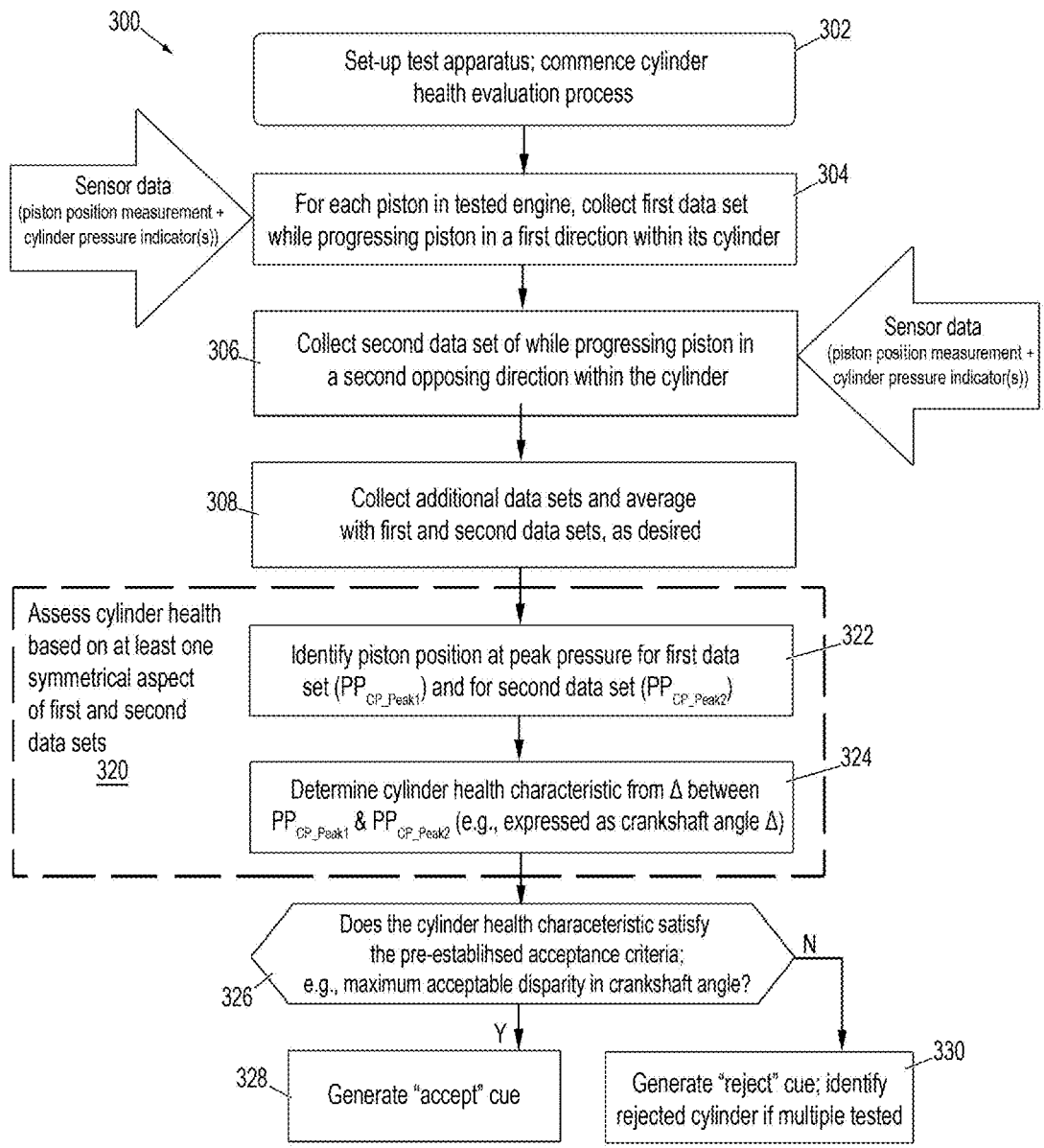
FIG. 9 is a process diagram illustrating further aspects of the disclosed system and/or method useful in determining cylinder leakage characteristics and other parameters related to cylinder health.

Embodiments of a cylinder health assessment process will now be described in conjunction with FIGS. 9-11. Referring initially to FIG. 9, an example process 300 is provided for evaluating the cylinder health or a cylinder health characteristic of one or more piston-cylinder assemblies included within a reciprocating piston engine. For convenience of explanation, cylinder health assessment process 300 is primarily described in conjunction with example engine 10 and the test configuration shown in FIG. 1. This example notwithstanding, it is emphasized that cylinder health assessment process 300 may be performed for various other types of reciprocating piston engines and utilizing other test configurations. Additionally, it will be understood that the steps shown in FIG. 9 and described below may be performed in alternative orders, certain steps may be omitted, and additional steps may be performed in further implementations of the cylinder health assessment process.

Cylinder health assessment process 300 commences with set-up of the test apparatus (step 302, FIG. 9). The set-up of the test apparatus will depend upon the data parameters collected during performance of process 300. As may embodiments of the above-described TDCM method, generally, cylinder health assessment process 300 may be performed either prior to or after installation of the cylinder head on the engine block. Thus, in certain embodiments, process 300 may be performed with the tested engine in a "short block" configuration; that is, prior to bolting or otherwise attaching the cylinder head to the engine block. It is particularly advantageous to perform process 300 with the engine cylinder head and the production head gasket installed, however, as such an arrangement enables a more accurate assessment of the engine in a fully assembled state and further permits installation of pressure sensors (or other sensors) in the ports provided in the cylinder head, as described above in conjunction with FIG. 1. This is a distinct advantage of embodiments of the TDCM method and cylinder health assessment process 300 as few, if any, conventional testing methods for determining TDC or for evaluating cylinder health may be performed with the cylinder head in place. Additionally, the necessity of securely mounting the tested engine to a specialized fixture or stand may be greatly reduced or eliminated as compared to other known testing methods.

At least two data parameters are recorded during cylinder health assessment process 300: (i) a first data parameter indicative of piston position ("piston position measurements"), and (ii) a second data parameter indicative of cylinder pressure ("pressure indicator measurements"). The piston position measurements may be recorded as any parameter from which the translational position of a piston within its cylinder may be determined. As previously described, the piston position measurements are readily recorded utilizing a rotational encoder, which monitors the angular or rotational position of the crankshaft. For example, in the case of engine 10 shown in FIG. 1, the rotational position of crankshaft 22 may be monitored utilizing rotational encoder 38 and the resulting data may then be utilized to determine the position of a particular piston 16 within its respective cylinder 14. Rotational encoder 38 (FIG. 1) may be, for example, a high resolution optical encoder having a relatively large number of increments to enable the piston position to be monitored in a highly precise manner.

In addition to the piston position measurements, at least one data parameter indicative of cylinder pressure is further monitored during process 300 (FIG. 9). The parameter or parameters indicative of cylinder pressure may include, but are not limited to, sensor data directly measuring cylinder pressure, sensor data monitoring the forces applied to a piston or crankshaft, temperature data, and the like. It is particularly useful, although not strictly necessary, to monitor pressure directly utilizing pressure sensors temporarily fluidly coupled to the combustion chambers, such as pressure sensors 34 inserted into ports 32 as shown in FIG. 1. Alternatively or additionally, the torque applied to the crankshaft (e.g., crankshaft 22 shown in FIG. 10) may be measured and utilized to determining the pressure within the combustion chamber portion of the cylinders by, for example, calculating the force component exerted on the crankshaft based on the effective area of the piston, as well as the angle between connecting rod and the crankshaft. Changes in temperature within the combustion chamber of a given piston-cylinder assembly may also be indicative of cylinder pressure; however, due to lag in thermal changes and other factors, temperature measurements are typically better suited for usage in supplementing direct pressure measurements and/or crankshaft torque measurements.

With continued reference to process 300, a first data set is collected, while rotating the crankshaft in a first (e.g., clockwise) direction to progress the piston in its cylinder (step 304, FIG. 9). Afterwards, a second data set is collected, while rotating the crankshaft in a second (e.g., counterclockwise) direction to progress the piston in a second opposing direction within its cylinder (step 306, FIG. 9). The piston progressions are usefully, but not necessary, performed through the expected TDC of the piston. Manners in which data may be collected between the opposing piston progressions have been described in detail above and will not be repeated to avoid redundancy. Briefly, however, it is noted that the different known pressures may be created within the tested cylinder prior to each piston progression, whether the known pressure is equal to, greater than, or less than ambient. Additionally, the pressure within a tested cylinder may be equalized between the first-direction and second-direction piston progressions and/or at various other intervals during the testing process. A full set of position and pressure data need not be collected for the first-direction piston progression or the opposing-direction piston progression, providing that sufficient data is collected to perform the below-described data analysis. Finally, as further indicated by step 308 in FIG. 9, additional data sets may also be gathered and averaged, combined with the first and second data set, or otherwise compared with the first and second data sets during performance of cylinder health assessment process 300. For example, a third data set may be collected while the piston is again progressed in the first direction and symmetrical aspects of the third data set and second data set may further be compared to determine the cylinder health characteristic in a manner analogous to that described above in conjunction with FIG. 8.

Figure 10:
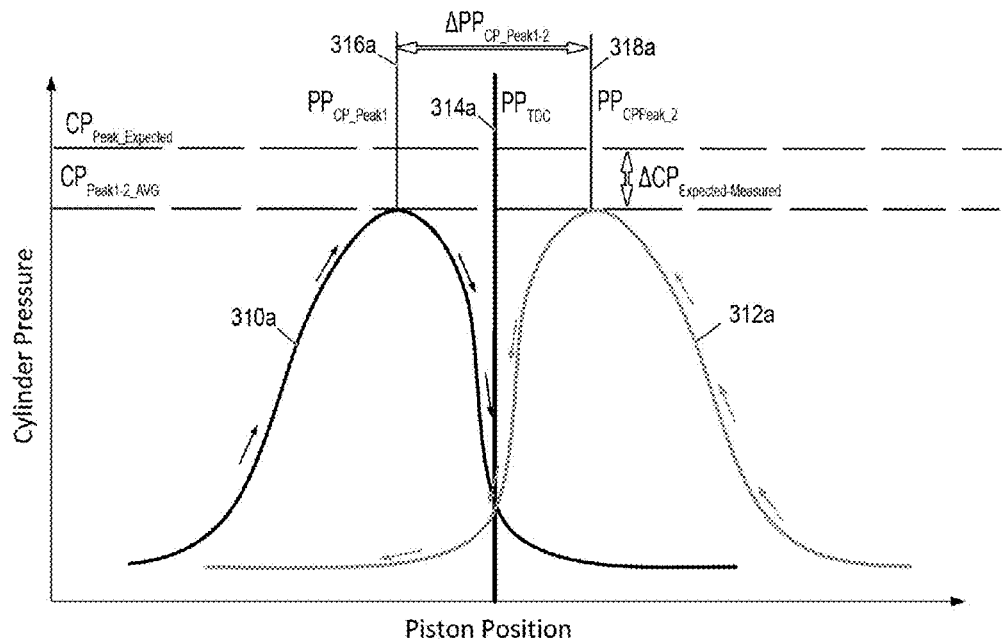
FIGS. 10 and 11 are graphical views of further modeling approaches associated with the disclosed system and/or method shown in FIG. 9.
Figure 11:
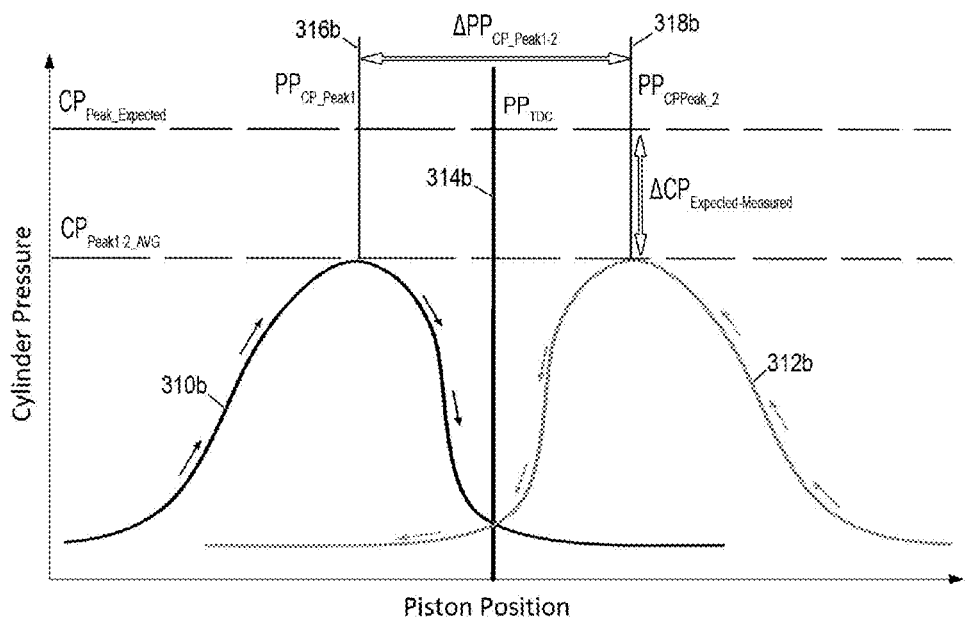

An example graphical representation of the two data sets that may be collected during step 304 and 306 of process 300 is shown in FIG. 10 and plotted as curves 310*a* and 312*a*, respectively. As indicated by line of symmetry 314*a*, TDC may be determined from curves 310*a* and 312*a* utilizing the TDCM method previously described. It is, however, unnecessary to calculate TDC when performing certain implementations of the below-described cylinder health (or leakage) assessment process. Furthermore, FIG. 10 is provided with the understanding that embodiment of cylinder health assessment process 300 may be carried-out without requiring graphical plotting of the data collected during step 304, 306, and 308 (FIG. 9). Instead, as was the case with the graphical representations shown in FIGS. 4-7, the graphical representations presented in FIG. 10 (and in FIG. 11 below) should be regarded an aid to understanding the analysis performed during cylinder health assessment. As before, it is noted that either (or both) of curves 310*a* and 312*a* may represent data from a single piston progression or may represent averaged (or otherwise combined) data from multiple piston progressions.

As indicated in FIG. 9 at process block 320, cylinder health is next assessed utilizing at least one symmetric aspect of the data sets collected during step 304 and 306 of example process 300. For example, corresponding or bilaterally symmetrical portions of data sets may be identified and compared to determine cylinder health. In one implementation, piston position measurements at the peak pressure for each data set are initially identified (step 322, FIG. 9). This may be more fully appreciated by referring to FIG. 10, wherein the piston position measurement at the peak pressure of curve 310*a* is identified by vertical line 316*a* and referred to hereafter as "$PP_{CP\_PEAK1}$." The piston position measurement at the peak pressure of curve 312*a* is further identified by vertical line 318*a* and referred to hereafter as "$PP_{CP\_PEAK2}$." It may also be seen in FIG. 10 that the peak pressure of curve 310*a* and the peak pressure of curve 312*a* are substantially equivalent. This is to be expected as the behavior of the piston-cylinder assembly will generally be the same regardless of which direction the piston follows its cyclical path. As a corollary, a fault condition may be signaled if a significant disparity occurs between the peak pressures of curves 310*a* and 312*a* or if a non-negligible asymmetry exists between curves 310*a* and 312*a*, providing that other process conditions (e.g., temperatures, starting pressures, and crankshaft rotational speeds) are held substantially constant when collecting the data sets represented by curves 310*a* and 312*a*.

A primary indicator of cylinder health is the separation or spread between the corresponding or symmetrical portions of the data sets. Thus, as indicated in FIG. 9 at step 324, cylinder health may be determined based, at least in part, in the disparity between the piston position measurements at the peak pressure for the first data set relative to the piston position at the peak pressure for the second data set. With continued reference to FIG. 10, this disparity corresponds with the separation distance or spread between the piston position measurement at which the peak pressure measurement occurs along curve 310*a* ($PP_{CP\_PEAK1}$) relative to the piston position measurement at which the peak pressure occurs along curve 300*b* ($PP_{CP\_PEAK2}$). The disparity or lateral spread between these two points is represented by double-headed arrow $\Delta PP_{CP\_Peak1-2}$. In instances wherein cylinder health is reduced by, for example, increasing cylinder leakage, the pressure peaks of curves 310*a* and 312*a* will diverge or spread apart along the axis representative of the piston position measurements (the abscissa in FIG. 10) such $\Delta PP_{CP\_Peak1-2}$ increases.

$\Delta PP_{CP\_Peak1-2}$ may be numerically expressed in different manners. In one implementation, $\Delta PP_{CP\_Peak1-2}$ is numerically expressed as a "cylinder health angle"; that is, the differential between the rotational position of the crankshaft at $PP_{CP\_Peak1}$ and the rotational position of the crankshaft at $PP_{CP\_Peak2}$. By way of non-limiting example, the differential between the rotational position of the crankshaft at $PP_{CP\_Peak1}$ and $PP_{CP\_Peak2}$, as expressed in degrees, may be calculated utilizing the following equation (EQ. 1):

$$(T_{TOTAL} - T_{REF\_CW} - T_{REF\_CCW} - T_{GAP}) \times \frac{360°}{TC_{TOTAL}} = \theta_{CH} \quad \text{EQ. 1}$$

wherein $T_{TOTAL}$ is the total number of teeth of the crankshaft or a geared member (e.g., timing wheel) mechanically linked thereto, $T_{REF\_CW}$ is the number of teeth from a chosen reference point to the pressure peak of the first data set (e.g., clockwise rotation), $T_{REF\_CCW}$ is the number of teeth from the reference point to the pressure peak of the second data set (e.g., counterclockwise rotation), $T_{GAP}$ is a gear teeth gap value, and $\theta_{CH}$ is the cylinder health angle. To provide a specific example, in an embodiment wherein $T_{TOTAL}=78$, $T_{REF\_CW}=57.384$, $T_{REF\_CCW}$ is 13.748, and $T_{GAP}=3$, this equation would yield a value of approximately 17.9° for $\theta_{CH}$. This example notwithstanding, other approaches may be utilized to determine the cylinder health characteristic in further embodiments of cylinder health assessment process 300. For example, in embodiments wherein piston position at TDC is calculated utilizing the above-described TDCM method or is otherwise known, the disparity or spread between either or both $PP_{CP\_PEAK1}$ and $PP_{CP\_PEAK2}$ and the TDC piston position may also be utilized to determine a cylinder health angle or other cylinder health characteristic.

As indicated in FIG. 9 at step 326, the cylinder health characteristic is next compared to one or more criteria to determine whether the health of the tested piston-cylinder assembly is acceptable. For example, in the case of exemplary implementation wherein the cylinder health characteristic is expressed as $\theta_{CH}$, $\theta_{CH}$ may be compared to a maximum acceptable crankshaft angle differential. The maximum acceptable crankshaft angle differential may be approximately 120° in an embodiment. When $\theta_{CH}$ is less than this threshold value, as was the case in the above-presented example, cylinder health assessment process 300 proceeds to step 328 and an accept cue may be generated by the computer system utilized to perform process 300. The accept cue may be generated as any type of notification sufficient to indicate to a technician or other personnel member that the cylinder health of the tested piston-cylinder assembly has met the health specifications. The accept cue may assume the form of textual annunciation or graphic generated on a monitor or other image-generating device, but may also assume other forms, such as a chime, an audible message, or the like produced utilizing a sound generator included in the computer system. Cylinder health assessment process 300 may then conclude for the tested piston-cylinder assembly. Process 300 may then be repeated for an additional piston-cylinder assembly included in the same or a different reciprocating piston engine.

If, at step 326 of process 300 (FIG. 9), it is instead determined that $\theta_{CH}$ is equal to or greater than the maximum acceptable crankshaft angle differential (or other acceptance criterion), cylinder health assessment process 300 advances to step 330 and a reject cue is generated. In embodiments wherein multiple piston-cylinder assemblies within the same reciprocating piston engine are tested concurrently or in series, the reject cue may also identify which piston-cylinder assemblies has failed to satisfy the acceptance threshold to facilitate any subsequently-performed diagnostic and repair operations. FIG. 11 further illustrates data sets plotted as curves 310b and 312b, which may be analogous to curves 310a and 312a of FIG. 9, respectively, but for a piston-cylinder assembly with relative poor health due to excessive gas leakage from the tested cylinder. As may be appreciated by comparing FIGS. 10 and 11, the piston positions corresponding to curves 310b and 312b ($PP_{CP\_PEAK1}$ and $PP_{CP\_PEAK2}$) respectively) have moved laterally apart relative to curves 310a and 312a (FIG. 10) such that $\Delta PP_{CP\_PEAK1-2}$ has increased. Thus, in the scenario illustrated in FIG. 11, the tested piston-cylinder assembly may be determined to have a relatively poor cylinder health, which fails to satisfy the acceptance criteria considered at step 326 of method 300 (FIG. 9).

As noted above, embodiments of cylinder health assessment process 300 may also consider other factors in determining the cylinder health of a tested piston-cylinder assembly. For example, in certain embodiments, the magnitude of the peak pressure values for the first and second data sets may be compared to an expected peak pressure in rendering the cylinder health assessment. This may be more fully appreciated by again referring to FIGS. 10 and 11 wherein an example expected peak pressure is indicated by the dashed line labeled "$CP_{PEAK\_EXPECTED}$," the average peak pressure of curves 310a-b and 312a-b is identified by the dashed line labeled "$CP_{PEAK\_1-2AVG}$," and the difference between $CP_{PEAK\_EXPECTED}$ and $CP_{PEAK\_1-2AVG}$ is represented by the double-headed arrow labeled "$\Delta CP_{EXPECTED-MEASURED}$." $CP_{PEAK\_EXPECTED}$ may be recalled from a memory included in the computer system utilized to perform process 300, such as the system shown in FIG. 1. The value of $CP_{PEAK\_EXPECTED}$ will depend upon the starting pressure within the combustion chamber, the rotational speed of shaft, and other such testing parameters. $CP_{PEAK\_EXPECTED}$ may be calculated or derived from historical testing data.

In the case of the relatively healthy piston-cylinder assembly represented by curves 310a and 312a in FIG. 10, $\Delta CP_{EXPECTED-MEASURED}$ has a relatively low value. Conversely, in the case of the less healthy piston-cylinder assembly represented by curves 310b and 312b in FIG. 11, the value of $\Delta CP_{EXPECTED-MEASURED}$ is considerably larger. As briefly indicated above in conjunction with FIG. 7, the lower value of $CP_{PEAK1-2\_AVG}$ (all other process conditions held constant) may indicate a higher leakage rate from the piston-cylinder assembly during testing. However, such a decrease in $CP_{PEAK\_AVG}$ is not necessarily indicative of excessive cylinder leakage. Instead, other factors may also contribute or account for such a decrease in $CP_{PEAK\_AVG}$. For example, $CP_{PEAK\_AVG}$ may decrease due to an increase in the volume of combustion chamber as may occur due to, for example, variations in piston geometry (e.g., piston bowl capacity) within acceptable manufacturing tolerances. Generally, such a decrease in $CP_{PEAK1-2\_AVG}$ is indicative of an increase in combustion chamber volume (rather than excessive cylinder leakage) when unaccompanied by an increased disparity in piston position measurements at $PP_{PEAK1}$ and $PP_{PEAK2}$. In contrast, an undesired increase in cylinder leakage may be signified by both a decrease in $CP_{PEAK1-2\_AVG}$ relative to $PP_{PEAK\_EXPECTED}$ and an increased disparity in piston position at $PP_{PEAK1}$ and $PP_{PEAK2}$. Thus, by comparing such symmetric characteristics or aspects of the first and second data sets, an assessment of individual components or factors (e.g., both changes leakage rates and in combustion chamber volumes) contributing to overall cylinder health may also be performed. Such information may be highly useful in assessing optimal manners in which to repair a faulty piston-cylinder assembly or to perform adjustments in design or manufacturing practices boosting cylinder health across multiple iterations of the manufacturing process. This notwithstanding, the cylinder health assessment may be based solely or primarily upon the disparity in piston position measurements at $PP_{PEAK1}$ and $PP_{PEAK2}$ ($\Delta PP_{CP\_Peak1-2}$) in certain embodiments of cylinder health assessment process 300.

Embodiments of a process for determining cylinder health in a reciprocating piston engine have thus been further provided. Embodiments of the above-described cylinder health assessment process are usefully, but not necessary performed in conjunction with embodiments of the above-described TDCM method. By virtue of the above-described cylinder health assessment process, the cylinder leakage characteristics or other health characteristics of a piston-cylinder assembly included in a reciprocating piston engine may be determined with a high degree of accuracy. As will be appreciated by one skilled in the art, the disclosed subject matter may be embodied as a method, system, or computer program product. Accordingly, certain embodiments may be implemented entirely as hardware, entirely as software (including firmware, resident software, micro-code, etc.) or as a combination of software and hardware aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A computer-implemented method of determining a leakage characteristic associated with one or more cylinders in which one or more pistons are configured to move cyclical motion, the computer-implemented method comprising:
progressing a piston in a first direction, along a first piston stroke included in the cyclical motion, toward an expected top dead center position of the piston;
determining, by one or more computing devices, as part of a first data set, a plurality of first positions of the piston as the piston is progressed in the first direction along the first piston stroke;
determining, by the one or more computing devices, as part of the first data set, a plurality of first pressure indicators corresponding to the plurality of first positions;
progressing the piston in a second direction, along a second piston stroke included in the cyclical motion, toward the expected top dead center position of the piston;
determining, by one or more computing devices, as part of a second data set, a plurality of second positions of the piston as the piston is progressed in the second direction along the second piston stroke;
determining, by the one or more computing devices, as part of the second data set, a plurality of second pressure indicators corresponding to the plurality of second positions;
determining, by the one or more computing devices, one or more first symmetric aspects of the first data set with respect to the second data set; and
determining, by the one or more computing devices, a leakage characteristic associated with the one or more cylinders based at least in part upon the determined one or more first symmetric aspects.

2. The computer-implemented method of claim 1, wherein one or more of the plurality of first positions and the plurality of second positions are determined using a rotational encoder attached to a crankshaft associated with the piston.

3. The computer-implemented method of claim 1, further comprising:
equalizing a cylinder containing the piston to an ambient pressure after progressing the piston in the first direction and before progressing the piston in the second direction.

4. The computer-implemented method of claim 1, wherein determining the symmetric aspect of the first data set with respect to the second data set is based upon, at least in part:
identifying one or more numerical distances between data from the first data set and data from the second data set.

5. The computer-implemented method of claim 1, further comprising:
progressing the piston again in the first direction along the first piston stroke, toward an expected top dead center position of the piston;
determining, as part of a third data set, a plurality of third positions of the piston as the piston is progressed again in the first direction along the first piston stroke;
determining, as part of the third data set, a plurality of third pressure indicators corresponding to the plurality of third positions; and
determining one or more second symmetric aspects of the third data set with respect to the second data set;
wherein determining, by the one or more computing devices, the leakage characteristic associated with the one or more cylinders is further based upon, at least in part, the determined one or more second symmetric aspects.

6. The computer-implemented method of claim 5, further comprising:
determining one or more average pressure indicators based upon, at least in part, the first data set and the third data set;
wherein determining one or more of the first and the second symmetric aspects is based upon, at least in part, the one or more average pressure indicators.

7. A computer-implemented method for determining cylinder health in a reciprocating piston engine containing a piston-cylinder assembly and a crankshaft, the piston-cylinder assembly including a cylinder and a piston configured to translate within the cylinder as the crankshaft rotates, the computer-implemented method comprising:
rotating the crankshaft in a first direction, while generating a first data set comprising a first plurality of piston position measurements and corresponding pressure indicator measurements;
rotating the crankshaft in a second opposing direction, while generating a second data set comprising a second plurality of piston position measurements and corresponding pressure indicator measurements;
identifying a symmetric aspect between the first and second data sets; and
determining a cylinder health characteristic for the piston-cylinder assembly based, at least in part, on the symmetric aspect.

8. The computer-implemented method of claim 7, further comprising:
generating an accept cue if the cylinder health characteristic surpasses a predetermined acceptance threshold; and
generating a reject cue if the cylinder health characteristic fails to surpass a predetermined acceptance threshold.

9. The computer-implemented method of claim 7, wherein identifying a symmetric aspect comprises:
identifying a first piston position measurement corresponding to a peak pressure in the first data set; and
identifying a second piston position measurement corresponding to a peak pressure in the second data set.

10. The computer-implemented method of claim 9, wherein determining a cylinder health characteristic comprises establishing the cylinder health characteristic based, at least in part, on a distance between the first and second piston position measurements.

11. The computer-implemented method of claim 7, further comprising:
monitoring the angular position of the crankshaft when rotating the crankshaft in the first and second directions; and
recording the angular positions of the crankshaft as the piston position measurements when generating of the first and second data sets.

12. The computer-implemented method of claim 11, wherein identifying a symmetric aspect comprises identifying first and second crankshaft angles corresponding to peak pressures in the first and second data sets, respectively, and wherein determining a cylinder health characteristic comprises calculating a differential between the first and second crankshaft angles.

13. The computer-implemented method of claim 12, further comprising:
   comparing the differential between the first and second crankshaft angles to a predetermined crankshaft health angle; and
   generating an accept cue if the differential between the first and second crankshaft angles is less than predetermined crankshaft health angle.

14. The computer-implemented method of claim 7, further comprising:
   receiving pressure sensor data from a pressure sensor fluidly coupled to the cylinder when rotating the crankshaft in the first and second directions; and
   recording the pressure sensor data as the pressure indicator measurements when generating of the first and second data sets.

15. The computer-implemented method of claim 7, further comprising:
   receiving torque data from a torque sensor mechanically coupled to the crankshaft when rotating the crankshaft in the first and second directions; and
   recording the torque sensor data as the pressure indicator measurements when generating of the first and second data sets.

16. The computer-implemented method of claim 7, wherein identifying comprises:
   expressing the first data set as a first position-pressure curve having a first pressure peak; and
   expressing the second data set as a second position-pressure curve having a second pressure peak.

17. The computer-implemented method of claim 16, wherein the cylinder health characteristic is determined as a function of a spread between the first and second pressure peaks, as taken along an axis corresponding to the piston position measurements.

18. The computer-implemented method of claim 17, further comprising:
   establishing an expected peak pressure; and
   further determining the cylinder health characteristic as a function of a differential between the expected peak pressure and the first peak pressure, the second peak pressure, or a combination thereof.

19. A computer system for determining cylinder health in a reciprocating piston engine containing a piston-cylinder assembly and a crankshaft, the piston-cylinder assembly including a cylinder and a piston configured to translate within the cylinder as the crankshaft rotates, the computer system comprising:
   one or more processor devices;
   a first sensor coupled to the one or more processor devices and configured to record measurements indicative of piston position measurements;
   a second sensor coupled to the one or more processor devices and configured to record measurements indicative of a pressure within the cylinder; and
   one or more memory architectures coupled to the one or more processor devices, the one or more memory architectures storing instructions that, when executed, cause the one or more processors to:
   generate a first data set while the crankshaft is rotated in a first direction utilizing data received from the first and second sensors, the first data set comprising a first plurality of piston position measurements and corresponding pressure indicator measurements;
   generate a second data set while the crankshaft is rotated in a second opposing direction utilizing data received from the first and second sensors, the second data set comprising a second plurality of piston position measurements and corresponding pressure indicator measurements;
   identify a symmetric aspect between the first and second data sets; and
   determine a cylinder health characteristic for the piston-cylinder assembly based, at least in part, on the symmetric aspect.

20. The computer system of claim 19, wherein the one or more processor devices are further configured to:
   generate an accept cue if the cylinder health characteristic surpasses a predetermined acceptance threshold stored in the one or more memory architectures; and
   generating a reject cue if the cylinder health characteristic fails to surpass a predetermined acceptance threshold.

* * * * *